(12) United States Patent
Mizusaki

(10) Patent No.: US 10,620,474 B2
(45) Date of Patent: Apr. 14, 2020

(54) LIQUID CRYSTAL DISPLAY DEVICE

(71) Applicant: SHARP KABUSHIKI KAISHA, Sakai, Osaka (JP)

(72) Inventor: Masanobu Mizusaki, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 138 days.

(21) Appl. No.: 15/558,874

(22) PCT Filed: Mar. 11, 2016

(86) PCT No.: PCT/JP2016/057703
§ 371 (c)(1),
(2) Date: Sep. 15, 2017

(87) PCT Pub. No.: WO2016/148042
PCT Pub. Date: Sep. 22, 2016

(65) Prior Publication Data
US 2018/0067361 A1  Mar. 8, 2018

(30) Foreign Application Priority Data
Mar. 18, 2015 (JP) ................. 2015-055306

(51) Int. Cl.
*G02B 5/30* (2006.01)
*G02F 1/1335* (2006.01)
(Continued)

(52) U.S. Cl.
CPC .... *G02F 1/133602* (2013.01); *C09K 19/0403* (2013.01); *C09K 19/062* (2013.01);
(Continued)

(58) Field of Classification Search
CPC .... G02F 1/133602; G02F 1/13; G02F 1/1337; G02F 1/133711; G02F 1/133723;
(Continued)

(56) References Cited

U.S. PATENT DOCUMENTS 4,003,844 A * 1/1977 Sorkin ................. C09K 19/582
252/299.5
2012/0229744 A1* 9/2012 Hattori ..................... C08F 2/50
349/124

(Continued)

FOREIGN PATENT DOCUMENTS

JP 2012-224632 A 11/2012
WO 2013/187373 A1 12/2013

*Primary Examiner* — Ruiyun Zhang
(74) *Attorney, Agent, or Firm* — ScienBiziP, P.C.

(57) ABSTRACT

The present invention provides, by using a photo-alignment film, a liquid crystal display device in which a good voltage holding ratio is retained for a long period of time and occurrence of image sticking and stain in a display screen is prevented. The liquid crystal display device of the present invention includes an active matrix liquid crystal panel and a backlight, the liquid crystal panel including a liquid crystal layer, a pair of substrates that sandwich the liquid crystal layer in between, and an alignment film disposed on a liquid crystal layer side surface of each of the substrates, each alignment film being a photo-alignment film formed from a material that exhibits a photo-alignment characteristic and containing carboxyl groups on the liquid crystal layer side, the liquid crystal layer containing a liquid crystal material and a nitrobenzene derivative.

12 Claims, 3 Drawing Sheets

(51) Int. Cl.
| | |
|---|---|
| C09K 19/12 | (2006.01) |
| C09K 19/54 | (2006.01) |
| C09K 19/30 | (2006.01) |
| C09K 19/56 | (2006.01) |
| C09K 19/20 | (2006.01) |
| C09K 19/24 | (2006.01) |
| C09K 19/04 | (2006.01) |
| C09K 19/32 | (2006.01) |
| C09K 19/06 | (2006.01) |
| C09K 19/14 | (2006.01) |
| G02F 1/1337 | (2006.01) |
| G02F 1/1362 | (2006.01) |

(52) U.S. Cl.
CPC .............. *C09K 19/12* (2013.01); *C09K 19/14* (2013.01); *C09K 19/20* (2013.01); *C09K 19/2007* (2013.01); *C09K 19/24* (2013.01); *C09K 19/3068* (2013.01); *C09K 19/3098* (2013.01); *C09K 19/32* (2013.01); *C09K 19/54* (2013.01); *C09K 19/56* (2013.01); *G02F 1/1337* (2013.01); *G02F 1/1362* (2013.01); *C09K 2019/122* (2013.01); *C09K 2019/123* (2013.01); *C09K 2019/301* (2013.01); *C09K 2019/3016* (2013.01)

(58) Field of Classification Search
CPC .......... G02F 1/133788; C09K 19/0403; C09K 19/062; C09K 19/12; C09K 19/14; C09K 19/20; C09K 19/54; C09K 19/56; Y10T 428/10; Y10T 428/1005; Y10T 428/1023
USPC ......... 428/1.1, 1.2, 1.26; 349/123, 163, 167, 349/186, 179; 252/299.5
See application file for complete search history.

(56) References Cited

U.S. PATENT DOCUMENTS

| | | |
|---|---|---|
| 2012/0268706 A1 | 10/2012 | Goebel et al. |
| 2013/0183460 A1* | 7/2013 | Klasen-Memmer ........................ C09K 19/062 428/1.4 |
| 2015/0152331 A1 | 6/2015 | Kawakami et al. |
| 2015/0159088 A1 | 6/2015 | Goebel et al. |

* cited by examiner (A-I)

(A-II)

(A-III)

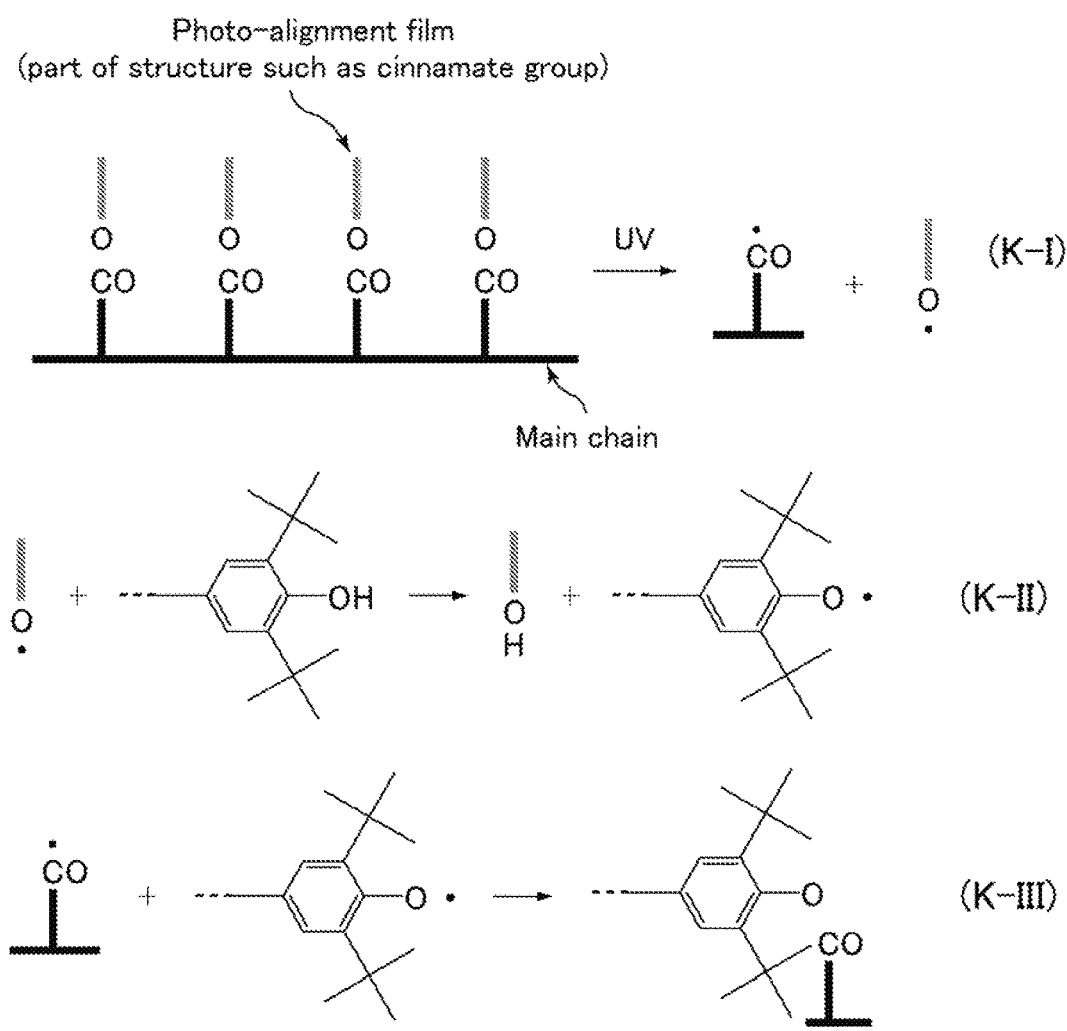

LIQUID CRYSTAL DISPLAY DEVICE

TECHNICAL FIELD

The present invention relates to a liquid crystal display device. More specifically, the present invention relates to a liquid crystal display device in which alignment of liquid crystal molecules is controlled by an alignment film.

BACKGROUND ART

A liquid crystal display device is a display device in which a liquid crystal composition is used for display, and a representative display method thereof is controlling the amount of light transmitted through a liquid crystal panel in which the liquid crystal composition is sealed between a pair of substrates by irradiating the liquid crystal panel with light from a backlight and by applying voltage to the liquid crystal composition to change the alignment of liquid crystal molecules. Such a liquid crystal display device has merits such as being thin and light and consuming a small amount of electricity, and thus is used for electronic devices such as smartphones, tablet PCs, and car navigation systems. In recent years, the definition of pixels has increased for use of, for example, a smartphone, and there has been a tendency that the number of conductive lines and the area of the black matrix provided in the liquid crystal panel increase along with this.

Typically, in a liquid crystal display device, the alignment of liquid crystal molecules in a state in which no voltage is applied is controlled by an alignment film that has been subjected to alignment treatment. Conventionally, as a method of alignment treatment, a rubbing method of rubbing the surface of the alignment film by, for example, a roller, has been widely used. However, since the number of conductive lines and the area of the black matrix provided in a liquid crystal panel have increased, steps have become more likely to be formed in the surface of a substrate in the liquid crystal panel. If steps are present in the surface of the substrate, the vicinity of the steps cannot be rubbed appropriately by using a rubbing method in some case. In the case where alignment treatment is not uniformly performed, decrease of a contrast ratio of the liquid crystal display device is caused.

To address this, in recent years, research and development have been promoted on a photo-alignment method of irradiating the surface of an alignment film with light as a method of alignment treatment that replaces the rubbing method. According to the photo-alignment method, alignment treatment can be performed without contact with the surface of the alignment film. Therefore, the alignment treatment is less likely to be uneven even in the case where steps are present in the surface of the substrate, and a merit that good liquid crystal alignment can be realized on the entire surface of the substrate can be achieved.

In addition, the increase of the number of conductive lines and the area of the black matrix provided in the liquid crystal panel decreases the area ratio (opening ratio) of an opening portion that can be used for displaying. The decrease of the aperture ratio directly leads to decrease of the amount of light that can be transmitted through the liquid crystal panel, and thus greatly improving the luminance of a backlight in order to retain the display performance of the liquid crystal display device in terms of, for example, a contrast ratio, has been considered.

Meanwhile, with regard to a liquid crystal composition used for a liquid crystal display device, it has been desired that the stability thereof is enhanced such that the liquid crystal composition endures a load during a production process of the liquid crystal display device and a produced liquid crystal display device can exhibit a stable characteristic for a long period of time. For example, Patent Literature 1 discloses adding a hindered amine photostabilizer to a liquid crystal composition to suppress decomposition of the liquid crystal composition caused by heating and exposure to ultraviolet light and improve the reliability of the liquid crystal display device particularly in terms of temporal change of a voltage holding ratio. In addition. Patent Literature 2 discloses that a liquid crystal composition that has a high voltage holding ratio and is stable against heat and light can be obtained by adding one, two, or more kinds of phenolic antioxidants to a liquid crystal compound having a negative anisotropy of dielectric constant.

CITATION LIST

Patent Literature

Patent Literature 1: JP 2012-224632A
Patent Literature 2: WO 2013/187373

SUMMARY OF INVENTION

Technical Problem

As described above, to address the increase in the definition of pixels, using the photo-alignment method and increasing the luminance of the backlight have been attempted. However, it has been revealed that stain (unevenness) is likely to occur at an end portion of the screen of the liquid crystal panel and an end portion of a displayed box pattern as a result of the attempts. It is to be noted that a malfunction of the end portion of the displayed box pattern is detected as image sticking. In addition, it has been also revealed that there is a tendency that the width of a seal material attaching the substrates together is set to be smaller to increase the ratio of a screen in the liquid crystal panel, and that stain is likely to occur in the periphery of the liquid crystal panel.

As a result of various investigations, the present inventors considered that the image sticking and stain described above occur through the following steps.

(1) Generation of Radical

As a result of the liquid crystal panel being irradiated with light from the backlight (amount of energy: hv), as shown in a formula (A-I), photofunctional groups contained in a photo-alignment film are excited and cleave, and thus radicals are generated. Particularly, in the case where a backlight whose luminance is increased is used, the generation of radicals is more prominent.

(A-I)

$P_{AL}$: Photofunctional group in photo-alignment film
$R_{AL}$: Radical generated from photo-alignment film (2-1) First Generation of Ions Radicals generated in the photo-alignment film are eluted into a liquid crystal layer, and the eluted radicals are ionized.

(2-2) Second Generation of Ions

Radicals generated in the photo-alignment film are eluted into the liquid crystal layer and are transferred from the photofunctional groups to liquid crystal molecules, and thus the liquid crystal molecules are ionized.

(2-3) Third Generation of Ions

Neutral impurities are ionized by moisture coming from the outside of the liquid crystal panel.

(3) Decrease of Voltage Holding Ratio

Ions in the liquid crystal layer stagnate in the end portion of the screen of the liquid crystal panel and the end portion of the displayed box pattern, and the voltage holding ratio (VHR) of the portions decreases, and thus the image sticking and stain described above occur.

It is to be noted that, as described above, there is a conventional liquid crystal composition to which additives such as antioxidants and photostabilizers are added. However, these additives do not solve a malfunction unique to a case of using a photo-alignment film. That is, in a liquid crystal display device, when oxygen enters the liquid crystal panel from outside and a liquid crystal material is oxidized, sometimes image sticking and stain of displayed screen are caused by oxides. To prevent this, conventionally, an antioxidant or the like additive that has a function of eliminating oxygen from an oxide generated by light or heat in the presence of oxygen has been added to a liquid crystal composition. However, in the case where radicals are generated from a photo-alignment film and the radicals are reacted with the antioxidant, the antioxidant is consumed, and thus the antioxidant cannot play the role that the antioxidant is supposed to play and oxidation of the liquid crystal molecules and the alignment film progresses. Oxides generated by this are also sometimes ionized, which also causes the decrease of VHR. Further, an alignment film formed from a material such as polyamic acid contains carboxyl groups, and some photostabilizer reacts with carboxyl groups exposed on the liquid crystal layer side to generate ionic impurities. Such ionic impurities also cause the decrease of VHR.

In view of the above state of the art, it is an object of the present invention to provide, by using a photo-alignment film, a liquid crystal display device in which a good voltage holding ratio is retained for a long period of time and occurrence of image sticking and stain in a display screen is prevented.

Solution to Problem

The present inventors focused on the fact that, in a liquid crystal display device including a photo-alignment film, the decrease of voltage holding ratio occurs at an end portion of a screen of a liquid crystal panel and an end portion of a displayed box pattern and this causes malfunctions such as image sticking and stain in a display screen. Therefore, as a result of an extensive study, the present inventors became the first to find out that the cause of the malfunctions is elution of radicals generated in the photo-alignment film exposed to light from the backlight into the liquid crystal layer. In addition, the present inventors carried out further studies, and found out that a nitrobenzene derivative has a high reactivity with radicals, does not produce ionic impurities with a member such as an alignment film, and can trap moisture coming from the outside. As a result of this, the present inventors found that the problem described above can be beautifully solved by containing, in a liquid crystal layer, a nitrobenzene derivative as a radical scavenger, and successfully reached the present invention.

That is, an embodiment of the present invention may be a liquid crystal display device of the present invention that includes an active matrix liquid crystal panel and a backlight, the liquid crystal panel including a liquid crystal layer, a pair of substrates that sandwich the liquid crystal layer in between, and an alignment film disposed on a liquid crystal layer side surface of each of the substrates, each alignment film being a photo-alignment film formed from a material that exhibits a photo-alignment characteristic and containing carboxyl groups on the liquid crystal layer side, the liquid crystal layer containing a liquid crystal material and a nitrobenzene derivative.

Advantageous Effects of Invention

According to the liquid crystal display device of the present invention, since the liquid crystal display device has the configuration described above, radicals eluted into the liquid crystal layer can be deactivated by a nitrobenzene derivative and further moisture coming from the outside can be trapped, and thus decrease of voltage holding ratio can be prevented. As a result of this, a good voltage holding ratio can be retained for a long period of time by using a photo-alignment film, and occurrence of image sticking and stain in a display screen can be prevented.

BRIEF DESCRIPTION OF DRAWINGS

FIG. 5 is a diagram illustrating a reaction of a phenolic antioxidant with a photo-alignment film.

DESCRIPTION OF EMBODIMENTS

An embodiment of the present invention will be described below. The present invention is not limited to what will be described in the embodiment below, and the design thereof can be appropriately modified within a range that satisfies the elements of the present invention.

Figure 1:
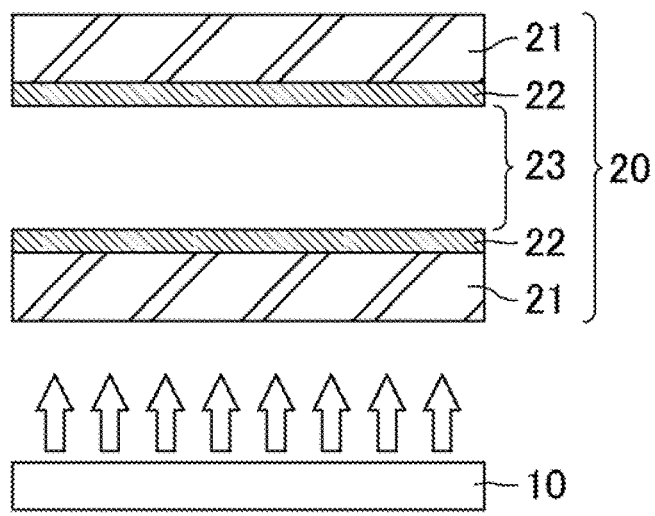
FIG. 1 is a schematic cross-sectional view of a liquid crystal display device of the present embodiment.

FIG. 1 is a schematic cross-sectional view of a liquid crystal display device of the present embodiment. A liquid crystal display device of the present embodiment includes an active matrix liquid crystal panel 20 and a backlight 10. The liquid crystal panel 20 includes a liquid crystal layer 23, a pair of substrates 21 that sandwich the liquid crystal layer 23 in between, and an alignment film 22 disposed on a liquid crystal layer 23 side surface of each of the substrates 21. Each alignment film 22 is a photo-alignment film formed from a material having a photo-alignment characteristic, and the liquid crystal layer 23 contains a liquid crystal material and a nitrobenzene derivative.

Any active matrix liquid crystal panel may be used as the active matrix liquid crystal panel 20 as long as the active matrix liquid crystal panel 20 includes the liquid crystal layer 23, the pair of substrates 21 that sandwich the liquid crystal layer 23 in between, and the alignment film 22 disposed on the liquid crystal layer 23 side surface of each of the substrates 21, and a normal liquid crystal panel employing an active matrix display system can be used. In an active matrix display system, normally, when an active element such as a thin-film transistor (TFT) provided in each pixel is on, a signal voltage is applied to the corresponding electrodes through the TFT, and an electrical charge charged in the pixel at this time is held during a period in which the active element is off. A voltage holding ratio (VHR) indicates a ratio of a charged electrical charge held in a period of one frame (for example, 16.7 ms). That is, a low VHR means that a voltage applied to the liquid crystal layer is likely to attenuate as time passes, and it is desired to increase the VKR in an active matrix display system.

Examples of the pair of substrates 21 include a combination of an active matrix substrate (TFT substrate) and a color filter substrate (CF substrate). As the active matrix substrate, an active matrix substrate that is normally used in the field of liquid crystal display device may be used. Examples of a configuration of the active matrix substrate in a plan view include a configuration that includes, on a transparent substrate, plural parallel gate signal lines; plural source signal lines extending in a direction perpendicular to the gate signal lines and formed to be parallel to one another; active elements such as TFTs disposed at positions corresponding to points of intersection of the gate signal lines with the source signal lines; pixel electrodes arranged in matrix in regions defined by the gate signal lines and the source signal lines; and so forth, in the case of a horizontal alignment mode, common lines; counter electrodes connected to the common lines; and so forth are further provided on the TFT substrate. As the TFT described above, a TFT in which a channel is formed by using an oxide semiconductor is preferably used. As the oxide semiconductor, for example, a compound (In—Ga—Zn—O) constituted by indium (In), gallium (Ga), zinc (Zn), and oxygen (O), a compound (In-Tin-Zn—O) constituted by indium (In), tin (Tin), zinc (Zn), and oxygen (O), or a compound (In—Al—Zn—O) constituted by indium (In), aluminum (Al), zinc (Zn), and oxygen (O) may be used.

As the color filter substrate described above, a color filter substrate that is normally used in the field of liquid crystal display device may be used. Examples of the configuration of the color filter substrate include a configuration in which a black matrix formed in a lattice shape, a color filter formed Inside the squares in the lattice, that is, pixels, and so forth are provided on a transparent substrate. In the case of a vertical alignment mode, common lines; common electrodes connected to the common lines; and so forth are further provided on the color filter substrate.

It is to be noted that, the pair of substrates 21 may be a pair of substrates on one of which both color filters and an active matrix are formed.

In addition, the alignment films 22 are interposed between the pair of substrates 21 and the liquid crystal layer 23. The alignment films 22 have a function of controlling the alignment of liquid crystal molecules in the liquid crystal layer 23, and, when a voltage applied to the liquid crystal layer 23 is less than a threshold voltage (including when no voltage is applied), the alignment of the liquid crystal molecules in the liquid crystal layer 23 is controlled mainly by the alignment films 22. An angle formed by a longitudinal axis of each liquid crystal molecule and the surfaces of the substrates 21 in this state is referred to as a "pre-tilt angle". It is to be noted that, in this description, a "pre-tilt angle" indicates an angle of inclination of the liquid crystal molecules from a direction parallel to the surfaces of the substrate, an angle parallel to the surface of the substrates is 0°, and the angle of a normal of the surface of each substrate is 90°.

The value of the pre-tilt angle of the liquid crystal molecules imparted by the alignment films 22 is not particularly limited, and the alignment films 22 may be horizontal alignment films and may be vertical alignment films. In the case where a display mode is a horizontal alignment mode such as a fringe field switching (FFS) mode or an in-plane switching (IPS) mode, horizontal alignment films are preferably used. In the case where horizontal alignment films are used, it is preferable that the pre-tilt angle is substantially 0° (for example, smaller than 10°), and it is more preferable that the pre-tilt angle is 0° from the viewpoint of achieving an effect of retaining a good contrast characteristic for a long period of time. Particularly, in the case of the FFS mode or the IPS mode, it is preferable that the pre-tilt angle is 0° also from the viewpoint of a viewing angle characteristic. However, in the case where the display mode is a twisted nematic (TN) mode, the pre-tilt angle is set to, for example, about 2° due to the restriction of the mode. In contrast, in the case where the display mode is a vertical alignment mode such as a 4-domain reverse twisted nematic (4D-RTN) mode, a 4-domain polymer sustained alignment (4D-PSA) mode, or a fish bone polymer sustained alignment (FB-PSA) mode, vertical alignment films are preferably used. In the case of vertical alignment films, it is preferable that the pre-tilt angle is substantially 90°. Particularly, in the case of the 4D-RTN mode or the 4D-PSA mode, it is preferable that the pre-tilt angle is set to 85.0° to 89.7°.

The alignment films 22 are photo-alignment films formed from a material that exhibits a photo-alignment characteristic. A material that exhibits a photo-alignment characteristic corresponds in general to a material whose structure is changed by being irradiated with light (electromagnetic wave) such as ultraviolet light or visible light to develop a nature (alignment regulating power) of regulating the alignment of liquid crystal molecules present in the vicinity thereof or to change in size and/or direction of the alignment regulating power.

Examples of the material that exhibits a photo-alignment characteristic include a material including a photoreactive part that causes a reaction such as dimerization (formation of dimer), isomerization, photo-Fries rearrangement, or degradation in response to irradiation with light. As a photoreactive part (functional group) that dimerizes or isomerizes in response to irradiation with light, for example, cinnamate shown in a formula (B-1) below, 4-chalcone shown in a formula (B-2-1) below, 4'-chalcone shown in a formula (B-2-2) below, coumarin shown in a formula (B-3) below, or stillbene shown in a formula (B-4) below is preferably used. An isomerization reaction and a dimerization reaction of the cinnamate are shown in a formula (B-1-I) below.

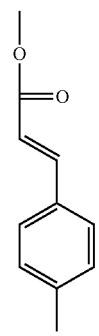

(B-1)

(B-2-1)

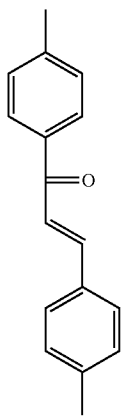

(B-2-2)

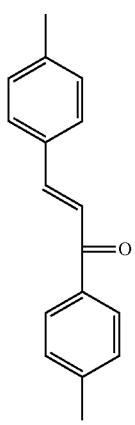

(B-3)

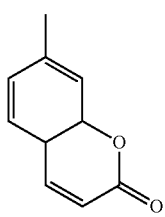

(B-4)

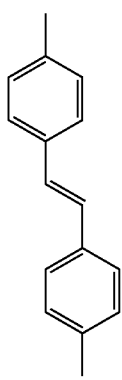

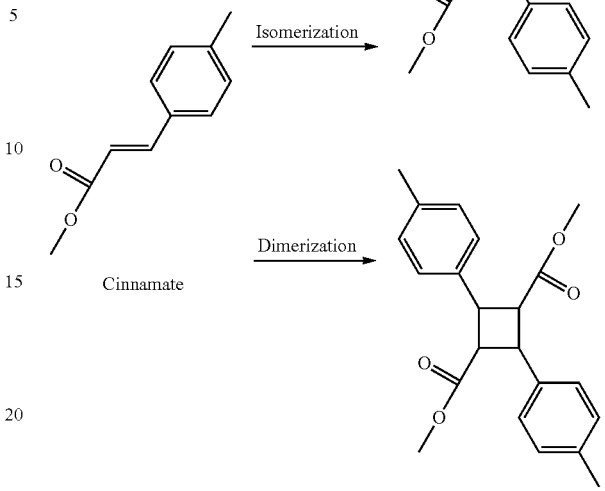

In addition, as a photoreactive part (functional group) that isomerizes in response to irradiation with light, for example, azobenzene is preferably used. Trans-azobenzene is shown in a formula (B-5-1) below, and cis-azobenzene is shown in a formula (B-5-2) below.

(B-5-1)

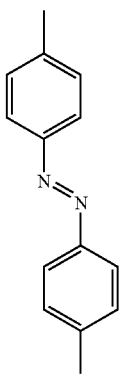

(B-5-2)

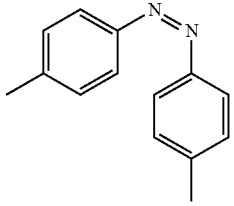

As a photoreactive part that causes photo-Fries rearrangement, for example, a phenol ester structure shown in a formula (B-6) below is preferably used. The phenol ester structure causes photo-Fries rearrangement as shown in a formula (B-6-I) below.

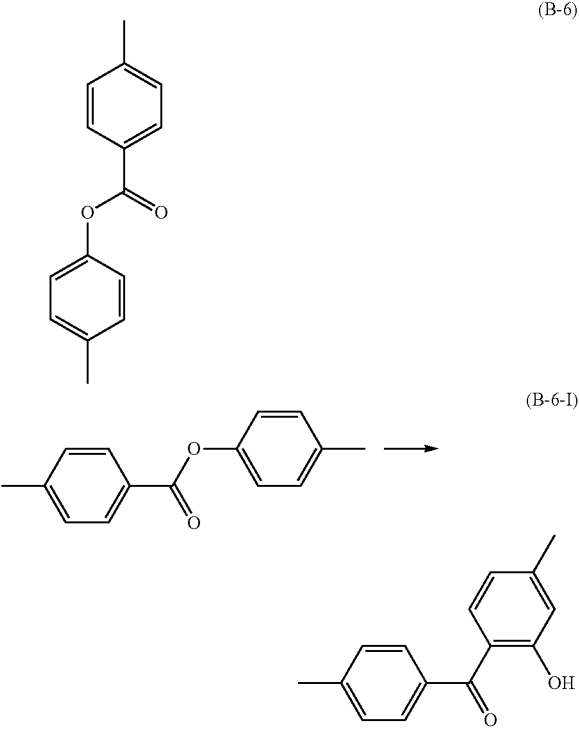

(B-6)

(B-6-I)

As a photo reactive part that is decomposed by being irradiated with light, for example, a cyclobutane structure is preferably used. Examples of a photo-alignment film including a cyclobutane structure includes a polymer obtained by subjecting an acid anhydride including a cyclobutane structure shown in a formula (B-7-1) below and a diamine compound shown in a formula (B-7-2) below serving as monomers to copolymerization. It is to be noted that, any of hydrogen atoms in the cyclobutane structure shown in the formula (B-7-1) below may be substituted by other atoms or functional groups.

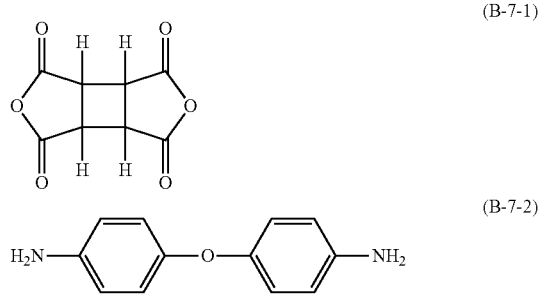

(B-7-1)

(B-7-2)

When the acid anhydride including the cyclobutane structure shown in the formula (B-7-1) above reacts with the diamine compound shown in the formula (B-7-2) above, polyamic acid is produced as shown in a formula (B-7-I) below. When a photo-alignment film is heated, polyimide is produced as shown in a formula (B-7-II) below. In an obtained photo-alignment film, a polyamic acid unit shown in the formula (B-7-I) below and a polyimide unit shown in the formula (B-7-II) are present at the same time. Further, when being irradiated with light, the ring of the cyclobutane structure of the polymer shown in the formula (B-7-II) below opens as shown in a formula (B-7-III), and exhibits a photo-alignment characteristic.

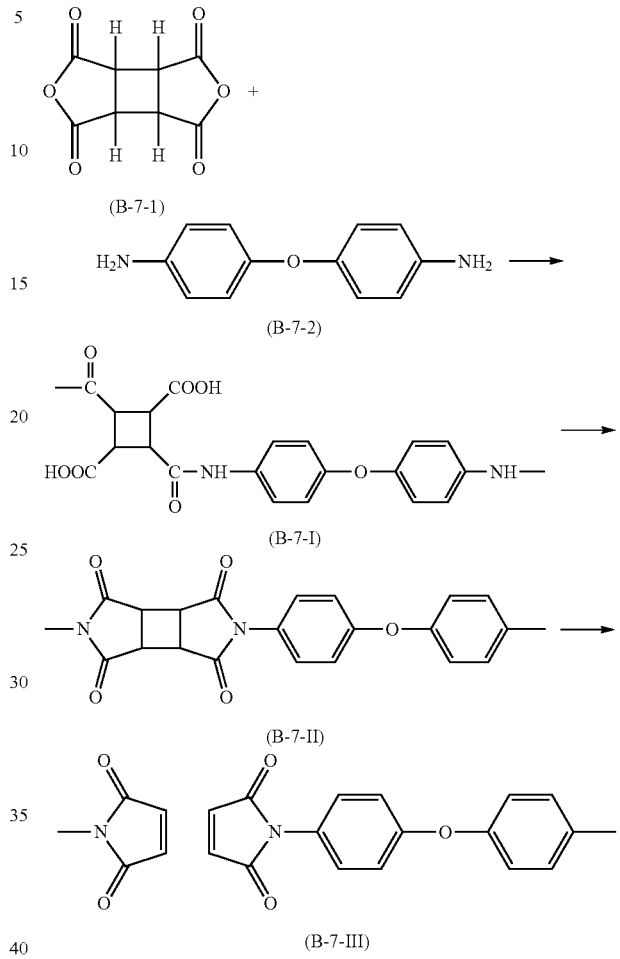

(B-7-1)

(B-7-2)

(B-7-I)

(B-7-II)

(B-7-III)

The alignment films 22 contain carboxyl groups on the liquid crystal layer side. The alignment films 22 are obtained by, for example, performing condensation polymerization of polyamic acid, the acid anhydride including the cyclobutane structure shown in the formula (B-7-1) above, and the diamine shown in the formula (B-7-2). When the alignment films are formed by performing condensation polymerization of these materials, carboxyl groups are exposed on the liquid crystal layer side of the alignment films because a polyamic acid unit and a polyimide unit are present at the same time. While the carboxyl groups have a high affinity with components such as epoxy resin and a silane coupling agent in the seal material and increases the adhesion strength between the alignment films and the seal material, in the case where a compound that reacts with acid is contained in the liquid crystal composition, there is a risk that the compound reacts with the carboxyl groups and ionic impurities and radicals are generated. However, the nitrobenzene derivative described above does not react with acid such as a carboxyl group, and thus the nitrobenzene derivative is not ionized and can scavenge the radicals.

In addition, in the present embodiment, a polymer sustained alignment (PSA) technique may be used. In the PSA technique, a liquid crystal composition containing a photo-polymerizable monomer is sealed between the pair of substrates 21, followed by irradiation of the liquid crystal layer 23 with light to polymerize the photopolymerizable monomer so that a polymer is formed on the surfaces of the alignment films 22. The PSA technique utilizes the polymer to fix the pre-tilt of the liquid crystal.

Examples of application of the PSA technique includes an embodiment that includes a layer containing a polymer obtained by polymerizing a photopolymerizable monomer represented by a formula (C) below on the liquid crystal layer 23 side surfaces of the alignment films 22.

$$A1\text{-}Y\text{-}A2 \quad (C)$$

(In the formula, Y represents a structure including at least one benzene ring and/or condensed benzene ring; any of hydrogen atoms in the benzene ring and condensed benzene ring may be substituted by a halogen atom; at least one of A1 and A2 represents acrylate or methacrylate; and A1 and A2 are directly bonded to the benzene ring or the condensed benzene ring.)

It is preferable that a skeleton Y in the formula (C) above has a structure represented by a formula (C-1), (C-2), or (C-3) below. It is to be noted that, each hydrogen atom in the formulae (C-1), (C-2), and (C-3) may be independently substituted by a halogen atom.

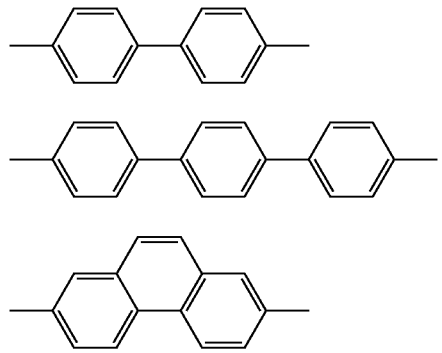

Specific examples of the photopolymerizable monomer represented by the formula (C) above include formulae (C-1-1), (C-1-2), and (C-3-1).

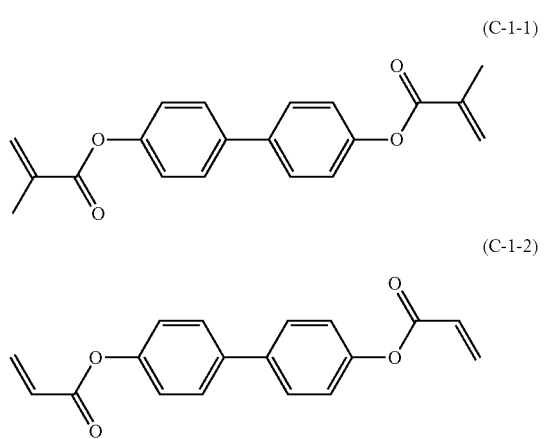

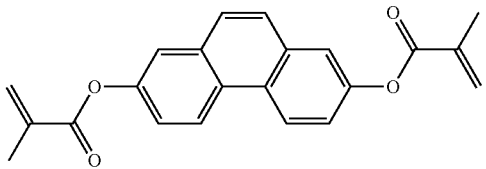

In the present embodiment, the liquid crystal layer 23 contains a liquid crystal material and the nitrobenzene derivative.

<Liquid Crystal Material>

An anisotropy of dielectric constant ($\Delta\varepsilon$) of the liquid crystal material defined by a formula (P) below may be a negative value or a positive value. That is, the liquid crystal material may have a negative anisotropy of dielectric constant and may have a positive anisotropy of dielectric constant. As the liquid crystal material having a negative anisotropy of dielectric constant, for example, a liquid crystal material having $\Delta\varepsilon$ of $-1$ to $-20$ can be used. As the liquid crystal material having a positive anisotropy of dielectric constant, for example, a liquid crystal material having $\Delta\varepsilon$ of 1 to 20 can be used.

$$\Delta\varepsilon = \text{(dielectric constant in a major axis direction)} - \text{(dielectric constant in a minor axis direction)} \quad (P)$$

In a conventional liquid crystal display device to which a radical scavenger is not added, there is a tendency that the malfunctions of image sticking and stain appear more prominently when a liquid crystal material having a negative anisotropy of dielectric constant is used than when a liquid crystal material having a positive anisotropy of dielectric constant. It is assumed that this is because a liquid crystal material having a negative anisotropy of dielectric constant has large polarization in the minor axis direction and the influence of decrease of the VHR caused when being ionized becomes greater. That is, the nitrobenzene derivative used in the present invention has a great effect in a system in which a liquid crystal material having a negative anisotropy of dielectric constant and a photo-alignment film are used in combination.

It is preferable that at least one component of the liquid crystal material is a compound including an alkenyl structure. Examples of the compound including an alkenyl structure include compounds represented by a formula (D-1), (D-2), or (D-3) below.

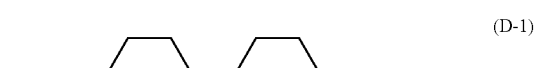

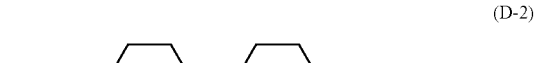

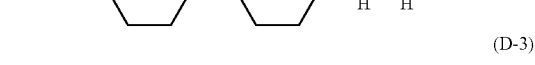

(In the formulae, m and n represent the same or different integers, and are preferably 1 to 6.)

Specific examples of the compounds including an alkenyl structure represented by the formula (D-1) above include a compound represented by a formula (D-1-1) below.

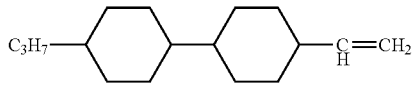

(D-1-1)

A compound including an alkenyl structure can reduce the viscosity of the liquid crystal material. Therefore, at least one component of the liquid crystal material being a compound including an alkenyl structure can improve the response speed in both cases of the liquid crystal material having a positive anisotropy of dielectric constant and a negative anisotropy of dielectric constant. On the other hand, a double bond of an alkenyl part is likely to be attacked by a radical, and thus it is considered that the alkenyl part is likely to be a factor of the decrease of VHR particularly when used in combination with a photo-alignment film.

It is preferable that at least one component of the liquid crystal material is a compound including an alkoxy structure. Examples of the compound including an alkoxy structure include compounds represented by a formula (E-1), (E-2), (E-3), (E-4), or (E-5) below.

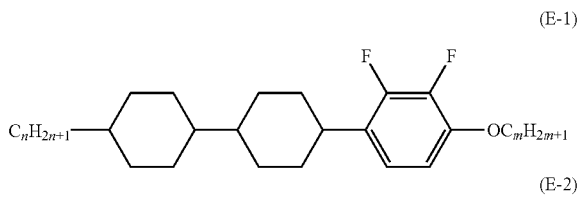

(E-1)

(E-2)

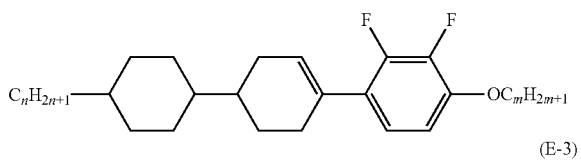

(E-3)

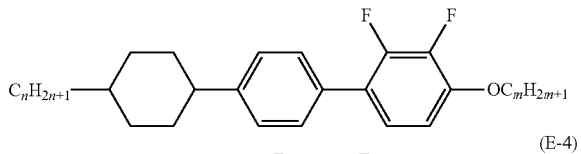

(E-4)

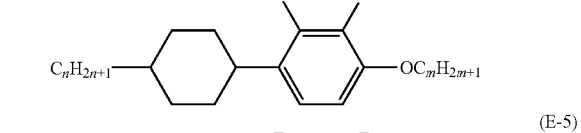

(E-5)

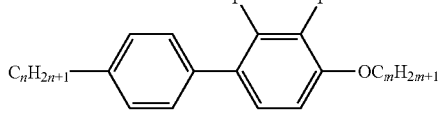

(In the formulae, m and n represent the same or different integers, and are preferably 1 to 7.)

Specific examples of the compounds including an alkoxy structure represented by the formula (E-3) above include a compound represented by a formula (E-3-1) below.

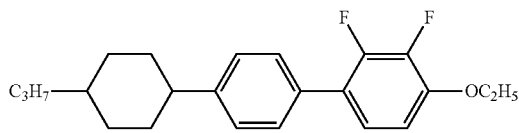

(E-3-1)

<Nitrobenzene Derivative>

A nitrobenzene derivative functions as a radical scavenger. The nitrobenzene derivative efficiently reacts with alignment film radicals generated in the photo-alignment films and liquid crystal radicals generated by the alignment film radicals transferring to the liquid crystal, and deactivates the alignment film radicals and liquid crystal radicals. In addition, the nitrobenzene derivatives can scavenge radicals without generating ionic impurities with members such as an alignment film. Further, moisture coming from the outside can be trapped, and thus neutral impurities being ionized by the moisture coming from the outside of the liquid crystal panel can be suppressed. According to these effects, the decrease of VHR of the liquid crystal display device can be suppressed and occurrence of stain and image sticking of a screen can be prevented.

Figure 2:
FIG. 2 is a diagram illustrating a reaction mechanism of a nitrobenzene derivative deactivating a radical generated in a photo-alignment film.
Figure 2:
Figure 2:
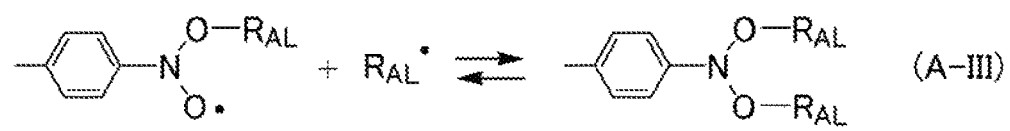

FIG. 2 is a diagram illustrating a reaction mechanism of a nitrobenzene derivative deactivating a radical generated in a photo-alignment film. As shown in a formula (A-I) of FIG. 2, a photofunctional group $P_{AL}$ in a photo-alignment film is excited by being irradiated with light (amount of energy: hv), and alignment film radicals $R_{AL}$ are generated. As shown in a formula (A-II) of FIG. 2, a nitrobenzene derivative added to the liquid crystal material constituting the liquid crystal layer 23 can selectively react with an alignment film radical $R_{AL}$ and deactivate the alignment film radical $R_{AL}$. However, the nitrobenzene derivative itself generates a new radical (—N—O•) as a result of a reaction between a nitro group and the alignment film radical $R_{AL}$. As shown in a formula (A-III) of FIG. 2, the new radical (—N—O•) bonds to another alignment film radical $R_{AL}$ and thus both of the radical generated from the nitrobenzene derivative and the alignment film radical $R_{AL}$ are eliminated. A nitrobenzene derivative can scavenge two radicals by one nitrobenzene skeleton, and thus has a high radical scavenging efficiency. As described above, in a system to which a nitrobenzene derivative has been added, reactions progress in the order of formula (A-I)→formula (A-II)→formula (A-III). The reactions of the formulae (A-II) and (A-III) are reversible reactions, and cycles of scavenging and releasing radicals are repeated. Thus, ionization of radicals can be hindered. As a result of this, generated radicals can be continuously deactivated without decreasing the amount of the nitrobenzene derivative, and thus generation of ions by the radicals can be continuously hindered for a long period of time. That is, by using a nitrobenzene derivative, the decrease of VHR caused by exposure to light from the backlight can be suppressed for a long period of time by addition of just a small amount.

Figure 3:
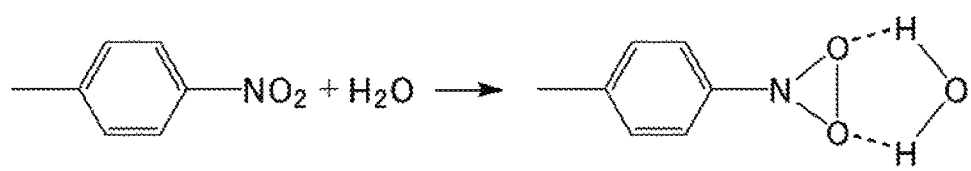
FIG. 3 is a diagram illustrating a reaction of a nitrobenzene derivative with a water molecule.

FIG. 3 is a diagram illustrating a reaction of a nitrobenzene derivative with a water molecule. As illustrated in FIG. 3, a nitrobenzene derivative can form hydrogen bonds between two oxygen atoms included in a nitro group and two hydrogen atoms included in a water molecule. Accordingly, water coming from the outside can be trapped, and thus stain in the periphery of the liquid crystal panel can be prevented even when the width of the seal material is reduced.

In addition, a nitrobenzene derivative has a high reactivity with radicals generated in the photo-alignment films, and thus can quickly deactivate radicals in the liquid crystal layer 23. Therefore, in the case of using an antioxidant in combination, this antioxidant being consumed by reacting with radicals generated in the photo-alignment films can be effectively suppressed, and, as a result, generation of oxides in the liquid crystal layer can be also suppressed. Therefore, image sticking and stain derived from oxides can be also prevented.

Further, as an effect of greatly suppressing generation of ions in the liquid crystal layer 23 by using a nitrobenzene derivative, it becomes possible to set a long frame period at the time of driving the liquid crystal display device. That is, it becomes possible to drive the liquid crystal display device at a low frequency, and, as a result, it becomes possible to reduce consumption of electricity.

A nitrobenzene derivative is a compound represented by a formula (F) below.

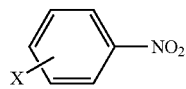
(F)

(In the formula, X represents a monovalent organic group.)

The nitrobenzene derivative represented by the formula (F) above may be a compound including two nitrobenzene skeletons in one molecule, and examples thereof include compounds represented by a formula (G-1), (G-2), (G-3), (G-4), or (G-5) below.

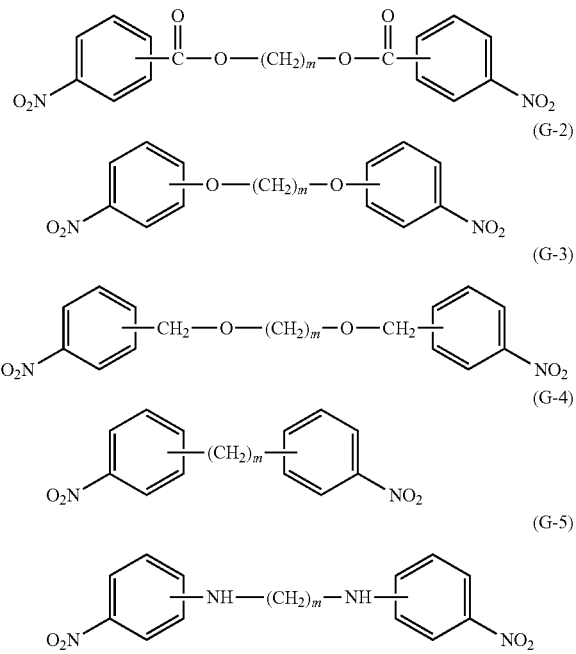

(In the formulae, m represents an even number from 2 to 18.)

Specific examples of the nitrobenzene derivative including one nitrobenzene skeleton in one molecule represented by the formula (G-1) above include a compound represented by a formula (G-1-1) below.

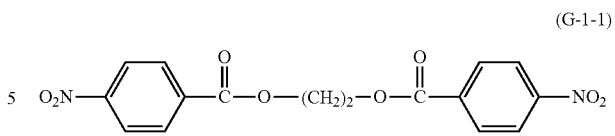
(G-1-1)

The nitrobenzene derivative represented by the formula (F) above may be a compound including one nitrobenzene skeleton in one molecule, and examples thereof include compounds represented by a formula (H-1), (H-2), (H-3), or (H-4) below.

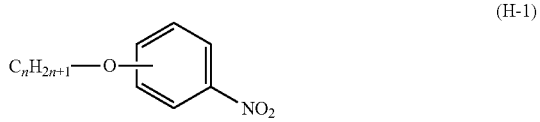
(H-1)

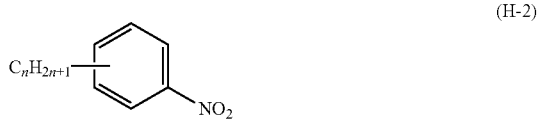
(H-2)

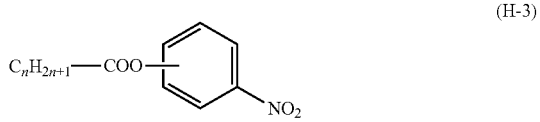
(H-3)

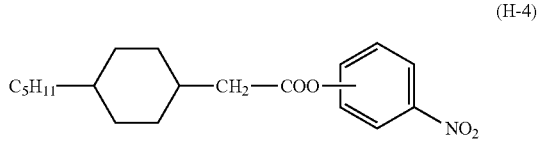
(H-4)

(In the formulae, n represents an integer from 1 to 18.)

Specific examples of the nitrobenzene derivative including one nitrobenzene skeleton in one molecule represented by the formula (H-1) above Include a compound represented by a formula (H-1-1) below.

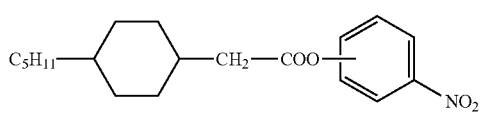
(H-1-1)

The concentration of the nitrobenzene derivative is preferably 1 ppm or higher and 5000 ppm or lower. Within this range, radicals generated in the photo-alignment films can be sufficiently deactivated, and the effect of suppressing the decrease of VHR can be achieved particularly sufficiently. A nitrobenzene derivative can be present stably, and thus the concentration of the nitrobenzene derivative being too high may not be desirable for the liquid crystal alignment characteristic. Therefore, an antioxidant that will be described later may be added instead of increasing the concentration of the nitrobenzene derivative. A more preferable upper limit of the concentration of the nitrobenzene derivative is 500 ppm, and a furthermore preferable upper limit thereof is 250 ppm.

<Antioxidant>

The liquid crystal layer 23 may further contain a phenolic antioxidant represented by a formula (I) below. In addition, the liquid crystal layer 23 may contain an antioxidant different from a phenolic antioxidant.

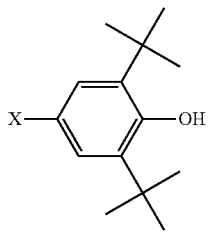

(In the formula, X represents a monovalent organic group.)

Figure 4:
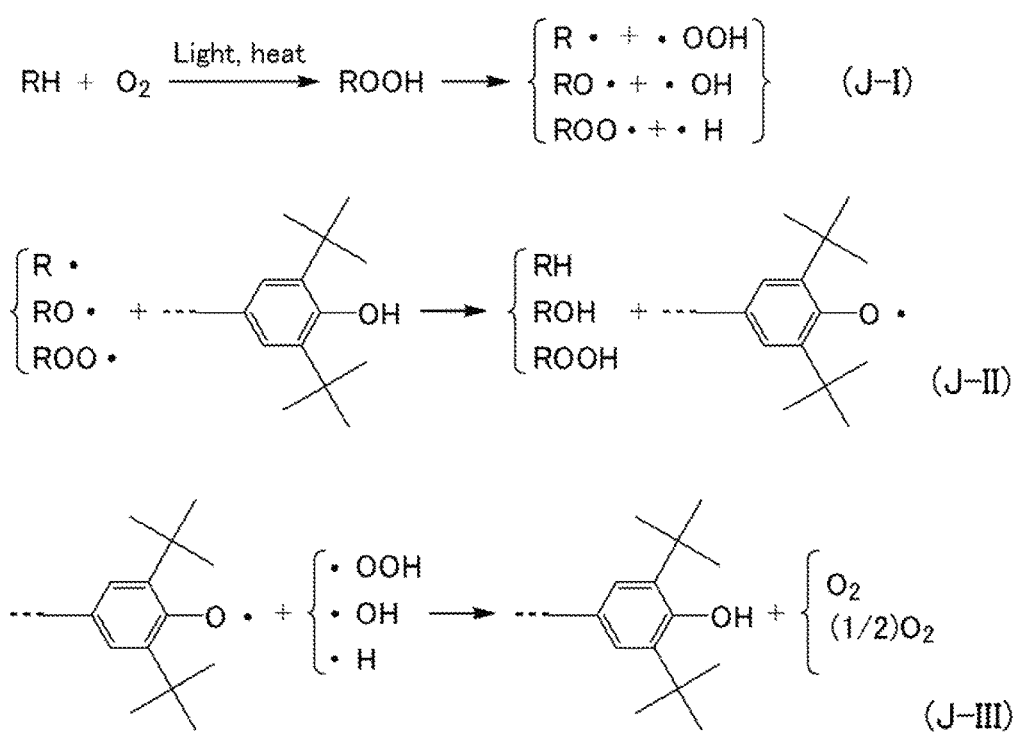
FIG. 4 is a diagram illustrating an effect of a phenolic antioxidant in the present invention.

FIG. 4 is a diagram illustrating an effect of a phenolic antioxidant in the present invention. In FIG. 4, R represents a group such as an alkyl group contained in the liquid crystal material, alignment film, and seal material. As shown in a formula (J-I) of FIG. 4, when oxygen enters the liquid crystal panel and light or heat energy is applied, the alkyl group (R), for example, contained in the liquid crystal material, alignment films, and seal material is oxidized, and an oxidized matter (ROOH) is generated. This oxidized matter generates radicals, and the radicals are ionized in a condition in which no antioxidant or radical scavenger is present. In the case where the liquid crystal material Is oxidized and ionized, ions are generated in the liquid crystal layer 23. In addition to this, ions are generated in the liquid crystal layer 23 also in the case where the alignment films or the seal agent is oxidized because oxidized matter dissociated from a polymer constituting the alignment films or the seal agent is ionized and eluted into the liquid crystal layer 23. Accordingly, ions in the liquid crystal layer 23 causes the decrease of VHR. Meanwhile, as a result of adding an antioxidant, as shown in formulae (J-II) and (J-III) of FIG. 4, the antioxidant reacts with radicals before the radicals are ionized, and thus generation of ions caused by oxidation of the liquid crystal material, photo-alignment films, and seal material can be prevented, in addition, the amount of the antioxidant does not decrease in the cycle shown in the formulae (J-II) and (J-III) of FIG. 4, and thus ionization of the radicals can be prevented for a long period of time.

As illustrated in FIG. 4, an antioxidant has a function of causing dissociation of oxygen from oxide (reduction) by repeating a cycle of dissociation→addition→dissociation of hydrogen groups, and suppresses deterioration (decomposition and ionization) caused by oxidation for a long period of time. However, the antioxidant is sometimes consumed by a reaction of the antioxidant with the photo-alignment films. FIG. 5 is a diagram illustrating a reaction of a phenolic antioxidant with a photo-alignment film. As shown in a formula (K-I) of FIG. 5, when a photo-alignment film is irradiated with ultraviolet light from the backlight, a cinnamate group, which is a photofunctional group, cleaves and radicals (—CO• and —O•) are generated. Next, as shown in a formula (K-II) of FIG. 5, the generated radical reacts with the antioxidant, and the antioxidant itself turns into an antioxidant radical. Here, as shown in a formula (K-III) of FIG. 5, the antioxidant radical sometimes bonds to a radical on the photo-alignment film side generated by the cleavage of the cinnamate group. In the case of the formula (K-III), the antioxidant bonded to the radical of a chain on the photo-alignment film side cannot return to the antioxidant again, and thus the amount of the antioxidant in the liquid crystal layer 23 gradually decreases. As described above, in the case where the consumption of the antioxidant continues for a long period of time, there is a possibility that prevention of the oxidation of the liquid crystal layer 23 and photo-alignment films becomes insufficient. Although the case where a carbon atom is on the main chain side of the alignment film (—COO—) is shown in the formula (K-I) of FIG. 5, the same applies to the case where an oxygen atom is on the main chain side of the alignment film (—OCO—). In addition, although an example of a cinnamate group is illustrated in FIG. 5, it is known that consumption of the antioxidant occurs similarly in the case of using another photofunctional group such as an azobenzene group. To address this, in the present embodiment, the consumption of an antioxidant is prevented by using the antioxidant in combination with a nitrobenzene derivative. A radical scavenger has a function of scavenging radicals generated by both oxides and non-oxides in the alignment films and liquid crystal, and prevents ionization of the radicals by repeating scavenging and releasing the radicals. It is considered that, with a nitrobenzene derivative that has a higher reactivity with radicals than an antioxidant does and continuously scavenges radicals in the photo-alignment films and liquid crystal, the reactions of consuming the antioxidant is suppressed, and thus the function of preventing oxidation can be retained.

Specific examples of the antioxidant represented by the formula (I) above include antioxidants represented by a formula (I-1), (I-2), or (I-3) below, and more specifically a formula (I-1-1) below.

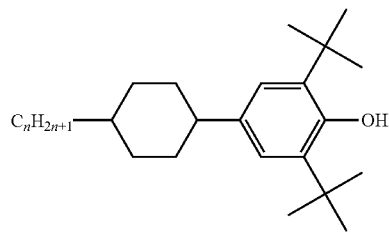

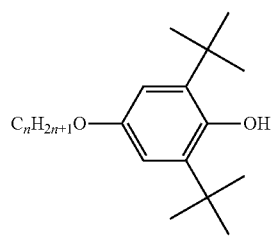

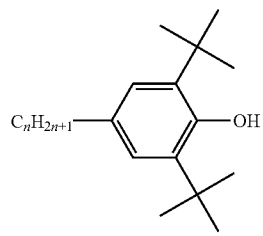

(In the formula, n represents an integer, and is preferably 3 to 20.)

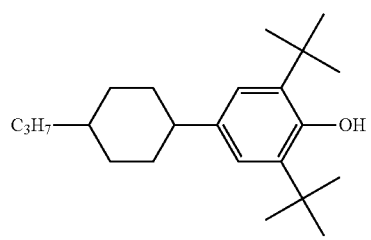

Other specific examples of the phenolic antioxidant represented by the formula (I) above include compounds represented by a formula (I-a), (I-b), (I-c), (I-d), (I-e), or (I-f) below.

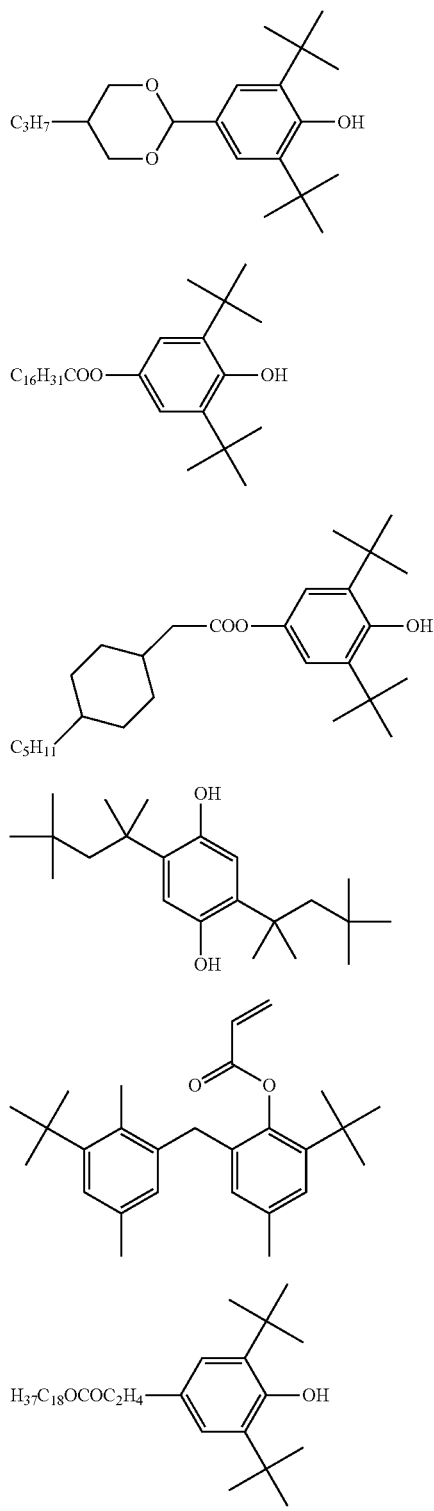

It is preferable that the concentration of the antioxidant is 1 ppm or higher and 10 weight % or lower. In this range, oxygen entering the liquid crystal panel from the outside can be prevented from oxidizing the liquid crystal material, and thus the image sticking and stain of the display caused by oxides can be effectively prevented. In addition, part of the radicals generated in the photo-alignment films can be deactivated by using an antioxidant as well as by using a nitrobenzene derivative, and the effect of suppressing the decrease of VHR can be particularly sufficiently achieved. A more preferable lower limit of the concentration is 10 ppm, a more preferable upper limit thereof is 5 weight %, and a furthermore preferable upper limit thereof is 1 weight %.

The alignment mode of the liquid crystal panel described above is not particularly limited, and, for example, horizontal alignment modes such as the FFS mode and the IPS mode; vertical alignment modes such as the 4D-RTN mode, the 4D-PSA mode, and the FS-PSA mode; and the TN mode can be used.

In the case where the alignment mode of the liquid crystal panel described above is a horizontal alignment mode, radicals are likely to be generated in the photo-alignment films, and thus the effect of adding a nitrobenzene derivative can be achieved more prominently. That is, whereas just slightly changing the pre-tilt angle from 90° is sufficient in photo-alignment treatment (radiation of polarized UV light) in a vertical alignment mode, the azimuth (direction in the substrate plane) of the alignment of the liquid crystal needs to be controlled more precisely in photo-alignment treatment in a horizontal alignment mode. Therefore, the amount of radiation in the photo-alignment treatment in the horizontal alignment mode is normally larger than in the case of the vertical alignment mode by one digit or more, and more radicals are more likely to be generated by a side reaction than in the case of the vertical alignment mode. A nitrobenzene derivative contained in the liquid crystal layer can deactivate radicals generated at the time of the photo-alignment treatment, and thus the radicals can be effectively prevented from remaining after completion of the liquid crystal panel (after injection of liquid crystal).

In the FFS mode, a structure (FFS electrode structure) including a planar electrode, a slit electrode, and an insulating film disposed between the planar electrode and the slit electrode is provided in at least one of the substrates 21, and an oblique electric field (fringe electric field) is formed in the liquid crystal layer 23 adjacent to the substrates 21. Normally, the slit electrode, insulating film, and planar electrode are arranged in this order from the liquid crystal layer 23 side. The slit electrode can be, for example, an electrode including a linear opening portion surrounded all around by an electrode as a slit or a comb-shaped electrode including plural comb tooth portions and linear cutouts that are positioned between the comb tooth portions and constitute slits.

In the IPS mode, at least one of the substrates 21 is provided with a pair of comb-shaped electrodes, and a transverse electric field is formed in the liquid crystal layer 23 adjacent to the substrate 21. As the pair of comb-shaped electrodes, for example, a pair of electrodes each including plural comb tooth portions and arranged such that the comb tooth portions engage with one another can be used.

In the 4D-RTN mode, one of the substrates 21 is provided with a pixel electrodes, and the other of the substrates 21 is provided with a common electrode, so that a longitudinal electric field is formed in the liquid crystal layer 23 adjacent to the substrates 21. The pair of substrates 21 includes a vertical alignment film, and is arranged such that alignment treatment directions are perpendicular to each other. In the 4D-RTN mode, four alignment directions different from one another can be defined in one pixel, and thus an excellent viewing angle characteristic can be achieved. Meanwhile, the pre-tilt angle needs to be controlled with a high precision, and thus photo-alignment treatment is preferably used.

In the liquid crystal panel 20 of the present embodiment, normally, the pair of substrates 21 are attached together by the seal material (not illustrated) provided so as to surround the periphery of the liquid crystal layer 23, and the liquid crystal layer 23 is retained in a predetermined region. For example, an epoxy resin or the like material containing inorganic filler or organic filler and a curing agent can be used as the seal material, and may further contain a silane coupling agent.

In addition, a polarizing plate (linear polarizer) may be disposed on each side of the pair of substrates 21 opposite to the liquid crystal layer 23. Typical examples of the polarizing plate Include a polyvinyl alcohol (PVA) film on which dichroic anisotropic material such as an iodine complex is adsorbed and aligned. Normally, a laminate of a PVA film and protective films such as triacetyl cellulose films disposed on both surfaces of the PVA film is put into practical use. In addition, optical films such as phase difference films may be disposed between polarizing plates and the pair of substrates 21.

As illustrated in FIG. 1, in the liquid crystal display device of the present embodiment, the backlight 10 is disposed on the back surface side of the liquid crystal panel. A liquid crystal display device having such a configuration is typically referred to as a transmissive liquid crystal display device. The backlight 10 is not particularly limited as long as the backlight 10 emits light including visible light, and may emit light including only visible light or light including both of visible light and ultraviolet light. For enabling color display of the liquid crystal display device, a backlight 10 that emits white light is preferably used. With regard to the type of the backlight 10, for example, light emitting diodes (LEDs) are preferably used. It is to be noted that, in the present description, "visible light" is used to refer to light (electromagnetic wave) having a wavelength of 380 nm or larger and smaller than 800 nm.

A feature of the present invention is also in deactivating, by using a nitrobenzene derivative, radicals generated in the photo-alignment films as a result of exposure to light from the backlight 10. Therefore, the nitrobenzene derivative can function effectively in the case where at least part of a light emission spectrum of the backlight 10 overlaps at least part of an absorption spectrum of the photo-alignment films.

The liquid crystal display device of the present embodiment is constituted by plural members including an external circuit such as a tape carrier package (TCP) or a print circuit board (PCB); an optical film such as a viewing angle expansion film or a luminance enhancing film; and a bezel (frame) in addition to the liquid crystal panel 20 and the backlight 10, and a member may be included in another member depending on the member. Since members other than the members having been already described are not particularly limited and members normally used in the field of liquid crystal display device can be used, the description thereof will be omitted.

An embodiment of the present invention has been described above, and all individual matters described above can be applied to the present invention overall.

Although the present invention will be described in further details by using examples and comparative examples below, the present invention is not limited to the examples.

EXAMPLE 1

A liquid crystal display device including a liquid crystal panel of a 4-domain reverse TN mode (4D-RTN mode) was actually produced by the following method.

First, a TFT substrate including TFTs, pixel electrodes, and so forth, and a CF substrate including a black matrix, color filters, a common electrode, and so forth were prepared. Then, an alignment film solution was applied to the surface of each of the TFT substrate and the CF substrate. A solid component of the alignment film solution was a polymer material including a polysiloxane structure as a main skeleton and cinnamate groups represented by a formula (B-1) below serving as photofunctional groups as aide chains, and a polyamic acid.

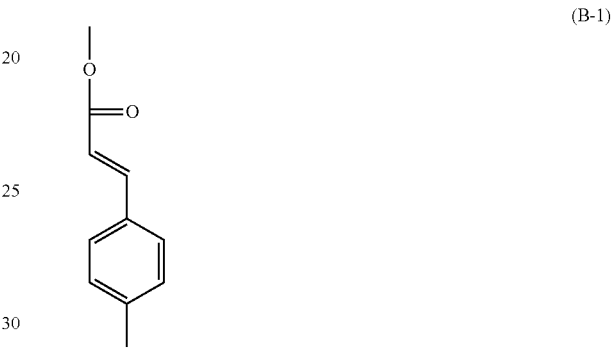

(B-1)

Next, both the substrates were heated at 80° C. to volatilize the solvent in the alignment film solution. Subsequently, both the substrates were heated at 230° C. for post-baking. In the post-baking, imidization (dehydration cyclization reaction) occurred in part of a polyamic acid structure, and a polyimide structure was formed. Then, as photo-alignment treatment, the surfaces of both the substrates were irradiated with linearly polarized light having a main wavelength of 313 nm at an intensity of 22 mJ/cm². The direction of polarization of the linearly polarized light was set to be inclined by 40° with respect to a surface on which the alignment film solution was applied. As a result of the irradiation with the linearly polarized light, the cinnamate groups underwent an isomerization reaction and a dimerization reaction, and thus an alignment regulating power developed. In this way, vertical alignment films in which a sufficient alignment regulating power was developed by the irradiation with light were obtained. The film thickness after the post-baking was 100 nm. The obtained alignment films each had a two-layer structure in which a polymer layer of a polymerized polyamic acid was formed on the substrate side and a polymer layer of a polymerized polymer material including a polysiloxane structure as a main skeleton and cinnamate groups represented by the formula (B-1) above serving as photofunctional groups as side chains was formed thereon.

Next, a liquid crystal composition was dripped onto the TFT substrate, and a seal material curable by heat and/or visible light was poured on the CF substrate by a dispenser. Then, the TFT substrate and the CF substrate were attached together such that the alignment treatment directions thereof were perpendicular to each other, and the liquid crystal composition was sealed between the substrates. The alignment films described above contained carboxyl groups on the liquid crystal layer side because the polyamic acid was partially exposed on the surface. At the time of attaching the substrates together, a display region was shielded from light, and exposure for curing the seal material was performed. The width of the seal material was 1.0 mm.

A liquid crystal material containing a compound including an alkenyl structure represented by a formula (D-1-1) below to which a nitrobenzene derivative represented by a formula (G-1-1) below was added was used as the liquid crystal composition. The concentration of the nitrobenzene derivative was set to 200 ppm with respect to the total amount of the liquid crystal composition. The liquid crystal material had a negative anisotropy of dielectric constant ($\Delta\varepsilon=-3.5$).

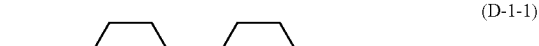

(D-1-1)

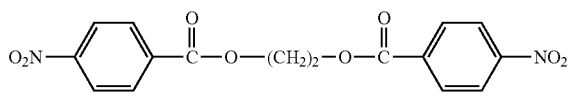

(G-1-1)

Then, a pair of polarizing plates were attached to the back surface (surface on which light from a backlight is incident) side of the TFT substrate and the observation surface (surface from which light from a backlight is emitted) aide of the CF substrate such that the polarization axes were in a relationship of crossed Nicols, and thus a liquid crystal panel for the 4D-RTN mode was produced.

Next, a backlight including white LEDs was attached to the back surface side of the liquid crystal panel, and thus the liquid crystal display device of Example 1 was completed.

COMPARATIVE EXAMPLE 1

A liquid crystal panel for the 4D-RTN mode was produced in the same manner as in Example 1 except that no nitrobenzene derivative was added to the liquid crystal composition.

COMPARATIVE EXAMPLE 2

A liquid crystal panel for the 4D-RTN mode was produced in the same manner as in Example 1 except that rubbing alignment films, which develop an alignment regulating power by rubbing treatment, were formed instead of the photo-alignment films, which develop an alignment regulating power by irradiation with light, and that no nitrobenzene derivative was added to the liquid crystal composition.

In Comparative Example 2, a polymer material including a polyamic acid structure in the main chain and not including a photoreactive part was used as the solid component of the alignment film solution. In addition, rubbing treatment was performed without performing photo-alignment treatment and an alignment regulating power perpendicular to the surface of a substrate was developed.

(Assessment Test 1)

A current was supplied, for 1000 hours, to the liquid crystal panels produced in Example 1 and Comparative Examples 1 and 2 in a state where the backlights (luminance of 8000 cd/m$^2$) were on. At this time, a black background and a white box pattern were displayed on the screens of the liquid crystal display devices. The VHR before the supply of current (initial VHR) and after 1000 hours was measured for each liquid crystal panel. In addition, after the supply of current for 1000 hours, the entire screen was switched to display at a gray scale value of 64, the screen of each liquid crystal panel was visually observed, and presence of stain and image sticking was checked. The results are shown in Table 1.

TABLE 1

| | VHR (%) (Initial) | VHR (%) (After 1000 hours) | Stain (After 1000 hours) | Image sticking (After 1000 hours) |
|---|---|---|---|---|
| Example 1 | 99.0 | 98.0 | Not present | Not present |
| Comparative Example 1 | 99.0 | 96.0 | Present | Present |
| Comparative Example 2 | 99.0 | 98.0 | Not present | Slightly present |

As can be seen from Table 1, the result of comparison between Example 1 and Comparative Example 1 indicates that the decrease of VHR was successfully suppressed by adding a nitrobenzene derivative to the liquid crystal material. In addition, the result of comparison between Comparative Example 1 and Comparative Example 2 indicates that the prominent decrease of VHR occurred in Comparative Example 1 was caused by the photo-alignment films. That is, it was revealed that the effect observed in Example 1 is prominent when a nitrobenzene derivative and photo-alignment films are used in combination. In addition, screen stain and image sticking were observed in Comparative Example 1. In Comparative Example 2, although no stain was observed, slight image sticking was observed. In contrast, in Example 1 in which a nitrobenzene derivative was added to the liquid crystal material, no stain or image sticking was observed.

In addition, a liquid crystal component including an alkenyl structure is effective for reducing the viscosity of the liquid crystal material. Meanwhile, a double bond included in the alkenyl structure is likely to be attached by a radical, and thus is likely to be a factor of the decrease of VHR in the case of being used in combination with photo-alignment films that can be a generation source of the radical. In Example 1, the attack of a radical on the alkenyl structure can be effectively prevented by adding a nitrobenzene derivative to the liquid crystal material. It is to be noted that the liquid crystal component including an alkenyl structure is preferably added not only to a liquid crystal material having a negative anisotropy of dielectric constant but also to & liquid crystal material having a positive anisotropy of dielectric constant from the viewpoint of improving the response speed of the liquid crystal display device.

EXAMPLE 2

A liquid crystal panel for the 4D-RTN mode was produced in the same manner as in Example 1 except that no compound including an alkenyl structure was added to the liquid crystal composition.

COMPARATIVE EXAMPLE 3

A liquid crystal panel for the 4D-RTN mode was produced in the same manner as in Example 2 except that no liquid crystal material containing a nitrobenzene derivative was added to the liquid crystal composition.

(Assessment Test 2)

A current was supplied, for 1000 hours, to the liquid crystal panels produced in Example 2 and Comparative Example 3 in the same manner as in Assessment Test 1, and the VHR before the supply of current (initial VHR) and after 1000 hours was measured. In addition, the screen of each liquid crystal panel was visually observed, and presence of stain and image sticking was checked. The results are shown in Table 2.

TABLE 2

| | VHR (%) (Initial) | VHR (%) (After 1000 hours) | Stain (After 1000 hours) | Image sticking (After 1000 hours) |
|---|---|---|---|---|
| Example 2 | 99.5 | 99.5 | Not present | Not present |
| Comparative Example 3 | 99.5 | 98.3 | Not present | Slightly present |

As can be seen from Table 2, the result of comparison between Example 2 and Comparative Example 3 indicates that the decrease of VHR was successfully suppressed by adding a nitrobenzene derivative to the liquid crystal material. In addition, the result of comparison between Example 2 and Comparative Example 3 Indicates that the decrease of VHR was successfully suppressed by adding a nitrobenzene derivative even without adding a liquid crystal material containing a compound including an alkenyl structure to the liquid crystal composition. In addition, in Comparative Example 3, although no stain was observed, slight image sticking was observed. In contrast, in Example 2 in which a nitrobenzene derivative was added to the liquid crystal material, no stain or image sticking was observed.

EXAMPLE 3

A liquid crystal panel of the fringe field switching mode (FFS mode) was actually produced by the following method.

First, a TFT substrate including TFTs, an FFS electrode structure, and so forth, and a color filter substrate (CF substrate) including a black matrix, color filters, and so forth were prepared. Then, an alignment film solution was applied to the surface of each of the TFT substrate and the CF substrate. A solid component of the alignment film solution was a polymer material including a polyamic acid structure and an azobenzene structure having a photo-alignment characteristic in the main chain.

Next, both the substrates were heated at 70° C. to volatilize the solvent in the alignment film solution. Subsequently, as photo-alignment treatment, the surfaces of both the substrates were irradiated with linearly polarized light having a main wavelength of 365 nm at an intensity of 2000 mJ/cm². The polarization direction of the linearly polarized light was set so as to be perpendicular to the direction in which the liquid crystal was to be aligned. As a result of the irradiation with the linearly polarized light, a trans-cis isomerization reaction occurred at the azobenzene structure, and thus an alignment regulating power developed. A trans-azobenzene structure has a structure represented by a formula (B-5-1) below, and a cis-azobenzene structure has a structure represented by a formula (B-5-2) below.

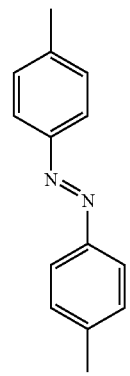

(B-5-1)

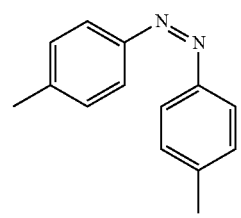

(B-5-2)

Then, both the substrates were heated at 220° C. for post-baking. In the post-baking, imidization (dehydration cyclization reaction) occurred in part of a polyamic acid structure, and a polyimide structure was formed. In this way, horizontal alignment films in which a sufficient alignment regulating power was developed by the irradiation with light were obtained. The film thickness after the post-baking was 100 nm.

Subsequently, the TFT substrate and the CF substrate were attached together in the same manner as in Example 1, and the liquid crystal composition was sealed between the substrates. The same liquid crystal composition as in Example 1 was used. The alignment films described above contained carboxyl groups on the liquid crystal layer side because the polyamic acid that was not imidized was partially exposed on the surface. The width of the seal material was 0.8 mm.

Then, a pair of polarizing plates were attached to the back surface (surface on which light from a backlight is incident) side of the TFT substrate and the observation surface (surface from which light from a backlight is emitted) side of the CF substrate such that the polarization axes were in a relationship of crossed Nicols. As described above, the liquid crystal panel for the FFS mode was produced. Subsequently, a backlight including white LEDs was attached to the back surface side of the liquid crystal panel, and thus the liquid crystal display device of Example 3 was completed.

COMPARATIVE EXAMPLE 4

A liquid crystal panel for the FFS mode was produced in the same manner as in Example 3 except that no nitrobenzene derivative was added to the liquid crystal composition.

COMPARATIVE EXAMPLE 5

A liquid crystal panel for the FFS mode was produced in the same manner as in Example 3 except that rubbing alignment films, which develop an alignment regulating power by rubbing treatment, were formed instead of the photo-alignment films, which develop an alignment regulating power by irradiation with light, and that no nitrobenzene derivative was added to the liquid crystal composition. In Comparative Example 5, a polymer material including a polyamic acid structure in the main chain was used as the solid component of the alignment film solution. In addition, rubbing treatment was performed without performing photo-alignment treatment.

(Assessment Test 3)

A current was supplied, for 1000 hours, to the liquid crystal panels produced in Example 3 and Comparative Examples 4 and 5 in the same manner as in Assessment Test 1, and the VHR before the supply of current (initial VHR) and after 1000 hours was measured. In addition, the screen of each liquid crystal panel was visually observed, and presence of stain and image sticking was checked. The results are shown in Table 3.

TABLE 3

| | VHR (%) (Initial) | VHR (%) (After 1000 hours) | Stain (After 1000 hours) | Image sticking (After 1000 hours) |
|---|---|---|---|---|
| Example 3 | 99.0 | 98.3 | Not present | Not present |
| Comparative Example 4 | 99.0 | 96.0 | Present | Present |
| Comparative Example 5 | 99.0 | 98.0 | Not present | Slightly present |

As can be seen from Table 3, the result of comparison between Example 3 and Comparative Example 4 indicates that the decrease of VHR was successfully suppressed by adding a nitrobenzene derivative to the liquid crystal material. In addition, the result of comparison between Comparative Example 4 and Comparative Example 5 indicates that the prominent decrease of VHR occurred in Comparative Example 4 was caused by the photo-alignment films. That is, it was revealed that the effect observed in Example 3 is prominent when a nitrobenzene derivative and photo-alignment films are used in combination. In addition, a screen stain and image sticking were observed in Comparative Example 4. In Comparative Example 5, although no stain was observed, slight image sticking was observed. In contrast, in Example 3 in which a nitrobenzene derivative was added to the liquid crystal material, no stain or image sticking was observed.

The reason why the decrease of VHR is caused by photo-alignment films is considered as follows.

The azobenzene structure included in the photo-alignment films used in Example 3 and Comparative Example 4 is subjected to alignment treatment by light having a wavelength of 365 nm, which is close to a visible light region. Meanwhile, the backlight of the liquid crystal display device mainly emits light of a visible light region for color display, and, from the results of Comparative Example 4, it is assumed that the short wavelength side of the light emission spectrum of the backlight and the long wavelength side of the absorption spectrum of the azobenzene structure slightly, although at a level difficult to detect in an actual spectrum analysis, overlap each other and radicals are generated. For example, as shown in a reaction formula shown below, the azobenzene structure is considered to undergo a photo-cleavage reaction being caused by light from the backlight. With regard to this, from the results of Example 3, it was revealed that the nitrobenzene derivative effectively deactivates the radicals generated by the reaction of the photo-alignment films and thus the decrease of VHR can be prevented.

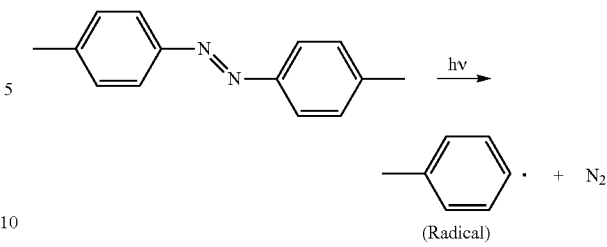

Examples of a photoreactive part that is subjected to alignment treatment by light having a wavelength close to a visible light region similarly to the azobenzene structure include cinnamate, chalcone, coumarin, stillbene, and phenol ester. These photoreactive parts are all considered to absorb, although slightly, light having a wavelength of 340 nm or larger, and thus can absorb the light from the backlight and be a generation source of radicals similarly to the azobenzene structure. For example, in the case of cinnamate, chalcone, or phenol ester, photo-Fries rearrangement (cleavage of an ester group) occurs and a radical is generated, and, in the case of chalcone, as shown in a reaction formula shown below, abstraction of hydrogen or photo-cleavage occurs and a radical is generated. Therefore, it is preferable to add a nitrobenzene derivative to the liquid crystal material also in the case of using photo-alignment films including these photoreactive parts.

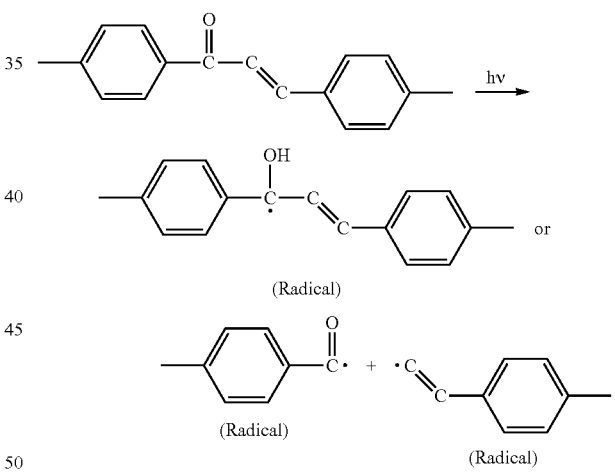

EXAMPLE 4

A liquid crystal display device including a liquid crystal panel of the FFS mode was actually produced in the same manner as in Example 3. The solid component of the alignment film solution was a polymer material including a polyamic acid structure obtained by performing condensation polymerization of an acid anhydride represented by a formula (B-7-1) below and a diamine compound represented by a formula (B-7-2) below. It is to be noted that any of hydrogen atoms of the cyclobutane in the acid anhydride represented by the formula (B-7-1) below may be substituted by other atoms or functional groups.

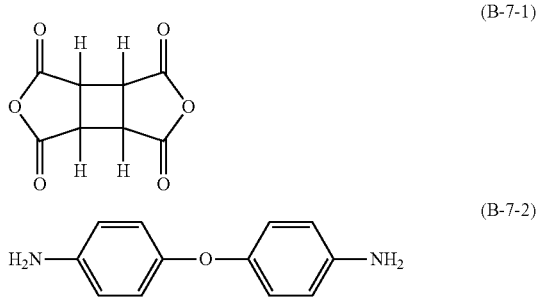

(B-7-1)

(B-7-2)

Next, both the substrates were heated at 70° C. to volatilize the solvent in the alignment film solution. Subsequently, both the substrates were heated at 230° C. for post-baking. In the post-baking, imidization (dehydration cyclization reaction) occurred in part of a polyamic acid structure, and a polyimide structure was formed. Then, as photo-alignment treatment, the surfaces of both the substrate were irradiated with linearly polarized light having a main wavelength of 254 nm at an intensity of 600 mJ/cm$^2$. The polarization direction of the linearly polarized light was set so as to be perpendicular to the direction in which the liquid crystal was to be aligned. As a result of the irradiation with the linearly polarized light, a decomposition reaction in which the cyclobutane part cleaves occurs as shown in a formula (B-7-A) below, the alignment regulating power in the polymer chain direction was eliminated, and thus an alignment regulating power in a direction perpendicular thereto developed. In this way, horizontal alignment films in which a sufficient alignment regulating power was developed by the irradiation with light were obtained. The film thickness after the post-baking was 100 nm.

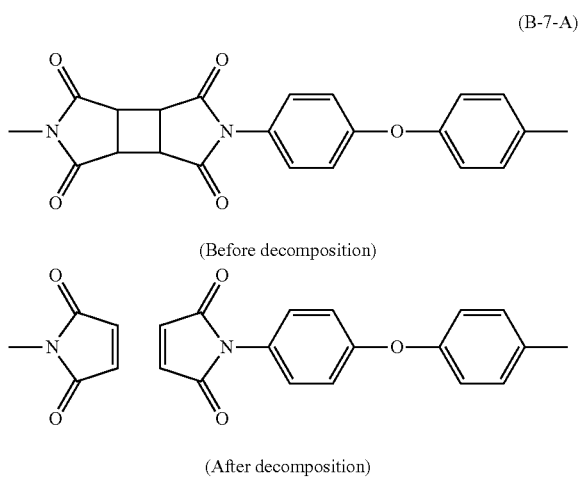

(B-7-A)

(Before decomposition)

(After decomposition)

Subsequently, the TFT substrate and the CF substrate were attached together in the same manner as in Example 1, and the liquid crystal composition was sealed between the substrates. The alignment, films described above contained carboxyl groups on the liquid crystal layer side because the polyamic acid was partially exposed on the surface. The width of the seal material was 0.8 nm. A liquid crystal material containing a compound including an alkoxy structure represented by a formula (E-3-1) below to which the same nitrobenzene derivative as in Example 1 represented by the formula (G-1-1) above was added was used as the liquid crystal composition. The concentration of the nitrobenzene derivative was set to 200 ppm with respect to the total amount of the liquid crystal composition. The liquid crystal material had a negative anisotropy of dielectric constant ($\Delta\varepsilon=-3.5$).

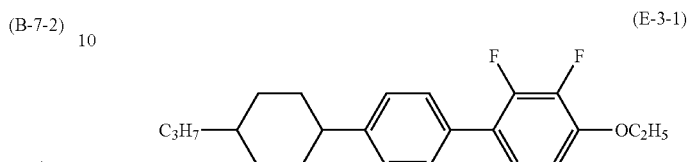

(E-3-1)

Then, a pair of polarizing plates were attached to the back surface (surface on which light from a backlight is incident) side of the TFT substrate and the observation surface (surface from which light from a backlight is emitted) side of the CF substrate such that the polarization axes were in a relationship of crossed Nicols, and thus a liquid crystal panel for the FFS mode was produced. Subsequently, a backlight including white LEDs was attached to the back surface side of the liquid crystal panel, and thus the liquid crystal display device of Example 4 was completed.

COMPARATIVE EXAMPLE 6

A liquid crystal display device of Comparative Example 6 was produced in the same manner as in Example 4 except that no nitrobenzene derivative was added to the liquid crystal composition.

(Assessment Test 4)

A current was supplied, for 1000 hours, to the liquid crystal panels produced in Example 4 and Comparative Example 6 in the same manner as in Assessment Test 1, and the VHR before the supply of current (initial VHR) and after 1000 hours was measured. In addition, the screen of each liquid crystal panel was visually observed, and presence of stain and image sticking was checked. The results are shown in Table 4.

TABLE 4

| | VHR (%) (Initial) | VHR (%) (After 1000 hours) | Stain (After 1000 hours) | Image sticking (After 1000 hours) |
|---|---|---|---|---|
| Example 4 | 99.0 | 99.0 | Not present | Not present |
| Comparative Example 6 | 99.0 | 98.0 | Not present | Slightly present |

As can be seen from Table 4, the decrease of VHR is larger in Comparative Example 6 than in Example 4, and it is indicated that the decrease of VHR was successfully suppressed by adding a nitrobenzene derivative to the liquid crystal material. In addition, in Comparative Example 6, although no stain was observed, slight image sticking was observed. In contrast, in Example 4 in which a nitrobenzene derivative was added to the liquid crystal material, no stain or image sticking was observed.

The cyclobutane structure included in the photo-alignment films used in Example 4 generates radicals in an intermediate stage of a reaction by, normally, mainly absorbing light having a wavelength of 300 nm or smaller as shown in a reaction formula below. However, the photo-alignment films including the cyclobutane structure may be sometimes modified to a structure with a better light absorbing characteristic to reduce the amount of exposure to light at the time of alignment treatment. In the case where such modification is performed, although the light absorbance for light on the longer wavelength side increases, there is a possibility that the short wavelength side of the light emission spectrum of the back light overlaps the long wavelength side of the absorption spectrum of the photo-alignment films. In addition, since the amount of exposure to light at the time of alignment treatment is as large as several hundreds of millijoules or larger per square centimeter, there is also a possibility that part of radicals generated in the alignment treatment is still not deactivated after completion of the liquid crystal panel. Therefore, a cause of occurrence of image sticking is also present in a photo-alignment film of a decomposition type including a cyclobutane structure, and it was confirmed that image sticking occurred in Comparative Example 6. In addition, from the results of Example 4, it was revealed that the nitrobenzene derivative effectively deactivates the radicals generated by the reaction of the photo-alignment films and thus image sticking can be prevented.

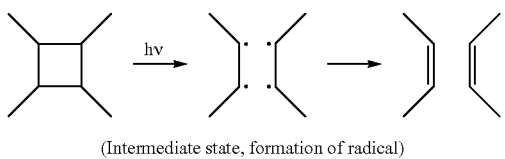

(Intermediate state, formation of radical)

In addition, the alkoxy structure in the liquid crystal material used in Example 4 is preferably used for adjusting the degree of anisotropy of dielectric constant of a liquid crystal material (negative liquid crystal) having a negative anisotropy of dielectric constant. The degree of anisotropy of dielectric constant of a liquid crystal material (positive liquid crystal) having a positive anisotropy of dielectric constant can be easily adjusted without using the alkoxy group. A conventional liquid crystal display device has a tendency that the VHR thereof decreases in the case of using a liquid crystal material including an alkoxy structure, and this tendency is particularly prominent in the case of using a photo-alignment film in combination. However, in the case of adding a nitrobenzene derivative as in the present invention, the decrease of VHR can be suppressed. The reason for this can be explained using the following Hypothesis Models 1 to 5.

[Hypothesis Model 1]

An alkoxy structure (particularly, a methoxy group and a ethoxy group) is an electron-releasing group, and has a resonance structure when exposed to light. The following formula represents part of a compound having an alkoxy structure, and shows three resonance structures corresponding to the alkoxy structure. Among these, a resonance structure (a) shown at the center and a resonance structure (b) shown on the right are ionic states, and thus cause the decrease of VHR. Further, the resonance structures (a) and (b) respectively change, in the presence of oxygen, to structures (a') and (b') including a peroxide structure. The structures (a') and (b') including a peroxide structure are easily turned into radicals as shown in (a") and (b"). The decrease of VHR is caused by ionization of the generated radicals.

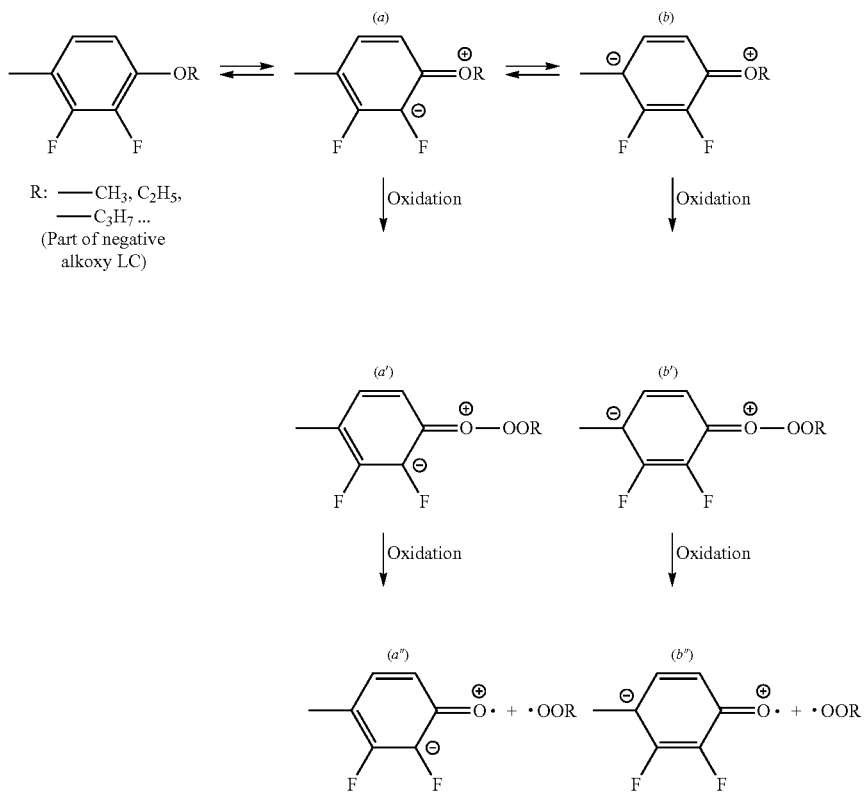

[Hypothesis Model 2]

As shown in a reaction formula below, an alkoxy structure (—OR) is likely to be attacked by a radical $R_{AL}$, generated in a photo-alignment film, and causes radical generation reactions of four patterns. The decrease of VHR is caused by ionization of the generated radicals.

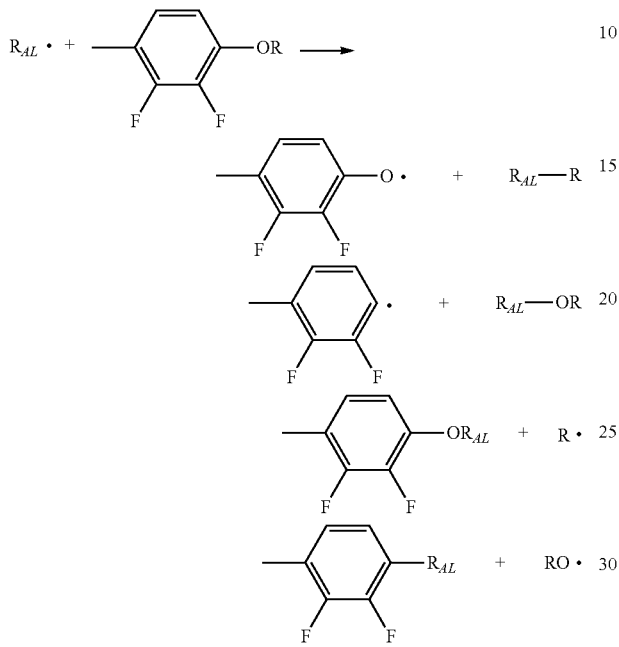

[Hypothesis Model 3]

As shown in a reaction, formula below, the radical $R_{AL}$ generated in the photo-alignment film bonds to oxygen in the liquid crystal layer and forms a peroxide structure (ROO.). An alkoxy structure (~OR) is likely to be attacked by a peroxide structure, and causes radical generation reactions of five patterns. In addition, in each pattern, after a radical generation reaction, other radical generation reactions are repeated like a chain reaction. The decrease of VHR is caused by ionization of the generated radicals. It is to be noted that the radical chain reaction going through a peroxide structure is known as an automatic oxidation reaction.

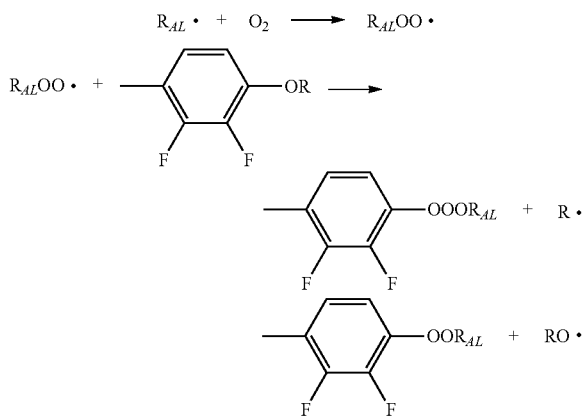

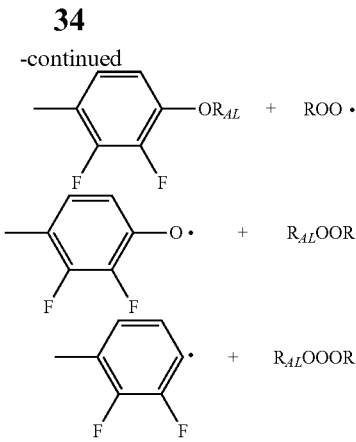

[Hypothesis Model 4]

A negative liquid crystal including an alkoxy structure is constituted by a molecular structure with a large polarization, and thus the solubility of impurity ions therein is higher than in a positive liquid crystal, and mobile ions are likely to be present in the liquid crystal. The mobile ions have an effect of canceling a charged electrical charge, and thus the VHR decreases as a result.

Radicals are involved in Hypothesis Models 1 to 3 described above, and these models can be addressed by scavenging the radicals by a radical scavenger. In addition, Hypothesis Model 4 explains that a positive liquid crystal is influenced more than a negative liquid crystal by ionic impurities generated through generation of radicals, and scavenging the radicals also indirectly addresses Hypothesis Model 4. As described above, an effect of suppressing the decrease of VHR caused in the case of using a liquid crystal material including an alkoxy structure can be achieved by containing a radical scavenger in the liquid crystal layer.

[Hypothesis Model 5]

A compound including an alkoxy structure generates a radical by itself by absorbing light (amount of energy: hv) such as ultraviolet light as represented by a formula below even without being subjected to transfer (attacking) of a radical generated in a photo-alignment film, for example. The decrease of VHR is caused by ionization of the generated radicals. A nitrobenzene derivative can absorb ultraviolet light. Further a nitrobenzene derivative can be concentrated more in the vicinity of an alignment film in the liquid crystal layer. Therefore, in the case of adding a nitrobenzene derivative to the liquid crystal material, the nitrobenzene derivative can absorb ultraviolet light incident on the liquid crystal layer before a compound including an alkoxy structure does. Therefore, even in the case where the amount of addition is small (in the order of several hundreds of parts per million), generation of radicals from the compound including an alkoxy group can be effectively suppressed, and stain and image sticking can be prevented.

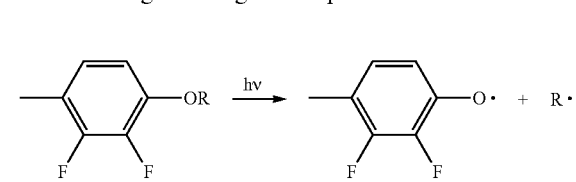

EXAMPLE 5

A liquid crystal display device including a liquid crystal panel of the FFS mode was actually produced in the same manner as in Example 3. A solid component of the alignment film solution was a polymer material containing a polysiloxane structure as a main skeleton and cinnamate groups represented by the formula (B-1) above serving as photo-functional groups as side chains, and a polyamic acid.

The alignment film solution was applied to the surface of each of the TFT substrate and the CF substrate, and then both the substrates were heated at 70° C. to volatilize the solvent in the alignment film solution. Subsequently, both the substrates were heated at 230° C. for post-baking. Then, as photo-alignment treatment, the surfaces of both the substrates were irradiated with linearly polarized light having a main wavelength of 313 nm at an intensity of 200 mJ/cm². The polarization direction of the linearly polarized light was set so as to be perpendicular to the direction in which the liquid crystal was to be aligned. As a result of the irradiation with the linearly polarized light, the cinnamate groups underwent an isomerization reaction and a dimerization reaction, and thus an alignment regulating power developed. In this way, horizontal alignment films in which a sufficient alignment regulating power was developed by the irradiation with light were obtained. The film thickness after the post-baking was 100 nm.

Subsequently, the TFT substrate and the CF substrate were attached together in the same manner as in Example 1, and the liquid crystal composition was sealed between the substrates. The alignment films described above contained carboxyl groups on the liquid crystal layer side because the polyamic acid was partially exposed on the surface. The width of the seal material was 0.8 mm. A liquid crystal material containing a compound having an alkenyl structure represented by the formula (D-1-1) above to which a nitrobenzene derivative represented by the formula (G-1-1) above and an antioxidant represented by a formula (I-f) below were added was used as the liquid crystal composition. The concentration of the nitrobenzene derivative was set to 200 ppm with respect to the total amount of the liquid crystal composition. The concentration of the antioxidant was set to 0.1 weight's with respect to the total amount of the liquid crystal composition. The liquid crystal material had a positive anisotropy of dielectric constant (Δε=+9.0).

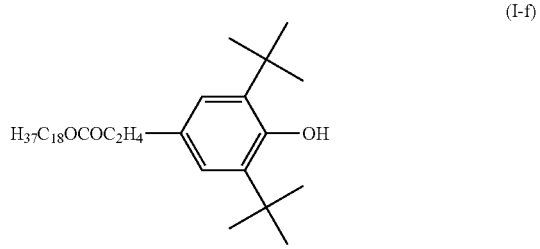

(I-f)

Then, a pair of polarizing plates were attached to the back surface (surface on which light from a backlight is incident) side of the TFT substrate and the observation surface (surface from which light from a backlight is emitted) aide of the CF substrate such that the polarization axes were in a relationship of crossed Nicola, and thus a liquid crystal panel for the FFS mode was produced. Subsequently, a backlight including white LEDs was attached to the back surface side of the liquid crystal panel, and thus the liquid crystal display device of Example 5 was completed.

COMPARATIVE EXAMPLE 7

A liquid crystal display device of Comparative Example 7 was produced in the same manner as in Example 5 except that no nitrobenzene derivative or antioxidant was added to the liquid crystal composition.

(Assessment Test 5)

A current was supplied, for 1000 hours, to the liquid crystal panels produced in Example 5 and Comparative Example 7 in the same manner as in Assessment Test 1, and the VHR before the supply of current (initial VHR) and after 1000 hours was measured. In addition, the screen of each liquid crystal panel was visually observed, and presence of stain and image sticking was checked. The results are shown in Table 5.

TABLE 5

| | VHR (%) (Initial) | VHR (%) (After 1000 hours) | Stain (After 1000 hours) | Image sticking (After 1000 hours) |
|---|---|---|---|---|
| Example 5 | 99.0 | 98.0 | Not present | Not present |
| Comparative Example 7 | 99.0 | 96.0 | Present | Present |

As can be seen from Table 5, the result of comparison between Example 5 and Comparative Example 7 indicates that the decrease of VHR was successfully suppressed by adding a nitrobenzene derivative and an antioxidant to the liquid crystal material. In Comparative Example 7, stain and image sticking occurred. The stain and image sticking are considered to be caused by the decrease of VHR. In contrast, in Example 5, such a malfunction was not observed as a result of adding a nitrobenzene derivative and an antioxidant.

EXAMPLE 6

A liquid crystal display device including a liquid crystal panel of the FFS mode was actually produced in the same manner as in Example 3 except that the width of the narrowest part of the seal material was 0.6 mm or smaller when the TFT substrate and the CF substrate were attached together.

COMPARATIVE EXAMPLE 8

A liquid crystal display device of Comparative Example 6 was produced in the same manner as in Example 6 except that no nitrobenzene derivative was added to the liquid crystal composition.

(Assessment Test 6)

A current was supplied, for 1000 hours, to the liquid crystal panels produced in Example 6 and Comparative Example 8 in the same manner as in Assessment Test 1, and the VHR before the supply of current (initial VHR) and after 1000 hours was measured. In addition, the screen of each liquid crystal panel was visually observed, and presence of stain and image sticking as checked. The results are shown in Table 6.

TABLE 6

| | VHR (%) (Initial) | VHR (%) (After 1000 hours) | Stain (After 1000 hours) | Image sticking (After 1000 hours) |
|---|---|---|---|---|
| Example 6 | 99.0 | 97.8 | Not present | Not present |
| Comparative Example 8 | 99.0 | 94.7 | Present (peripheral stain) | Present |

As can be seen from Table 6, the result of comparison between Example 6 and Comparative Example 8 indicates that the decrease of VHR was successfully suppressed by adding a nitrobenzene derivative to the liquid crystal material. In Comparative Example 8, as a result of setting the seal width to be 0.6 mm or smaller, moisture entered the liquid crystal panel from the outside, and the VHR decreased prominently. In contrast, in Example 6, by adding a nitrobenzene derivative to the liquid crystal material, not only ionization of radicals generated in the photo-alignment films was suppressed but also ionization of neutral impurities by the moisture that entered the liquid crystal panel from the outside was successfully suppressed, and, as a result, it was revealed that the decrease of VHR could be suppressed. Whereas stain was observed in the periphery of the screen due to the entry of the moisture in Comparative Example 8, no stain (stain in the periphery of the screen) or image sticking was observed in Example 6 in which a nitrobenzene derivative was added to the liquid crystal material.

EXAMPLE 7

A liquid crystal display device including a liquid crystal panel of the FFS mode was actually produced in the same manner as in Example 3. A solid component of the alignment film solution was a polymer material containing a polysiloxane structure as a main skeleton and cinnamate groups represented by the formula (B-1) above serving as photo-functional groups as side chains, and a polyamic acid.

The alignment film solution was applied to the surface of each of the TFT substrate and the CF substrate, and then both the substrates were heated at 70° C. to volatilize the solvent in the alignment film solution. Subsequently, both the substrates were heated at 230° C. for post-baking. Then, as photo-alignment treatment, the surfaces of both the substrates were irradiated with linearly polarized light having a main wavelength of 313 nm at an intensity of 20 mJ/cm². The polarization direction of the linearly polarized light was set so as to be perpendicular to the direction in which the liquid crystal was to be aligned. As a result of the irradiation with the linearly polarized light, the cinnamate groups underwent an isomerization reaction and a dimerization reaction, and thus an alignment regulating power developed. In this way, horizontal alignment films in which an alignment regulating power was developed by the irradiation with light were obtained. The film thickness after the post-baking was 100 nm. In this example, the amount of exposure to light at the time of photo-alignment treatment was reduced compared with Example 5 in which the same alignment film solution was used, and, as will be described later, the alignment regulating power was improved by causing a photopolymerizable monomer added to the liquid crystal material to polymerize on the surfaces of the alignment films.

Subsequently, the TFT substrate and the CF substrate were attached together in the same manner as in Example 1, and the liquid crystal composition was sealed between the substrates. The alignment films described above contained carboxyl groups on the liquid crystal layer side because the polyamic acid was partially exposed on the surface. The width of the seal material was 0.8 mm. A liquid crystal material containing the same compound as in Example 1 having an alkenyl structure represented by the formula (D-1-1) above to which a photopolymerizable monomer represented by a formula (C-3-1) below, a nitrobenzene derivative represented by the formula (G-1-1) above, and an antioxidant represented by the formula (I-f) above were added was used as the liquid crystal composition. The amount of mixed photopolymerizable monomer was set to 0.25 wt % with respect to the total amount of the liquid crystal composition. The concentration of the nitrobenzene derivative was set to 200 ppm with respect to the total amount of the liquid crystal composition. The concentration of the antioxidant was set to 0.1 weight % with respect to the total amount of the liquid crystal composition. The liquid crystal material had a negative anisotropy of dielectric constant ($\Delta\varepsilon=-3.5$).

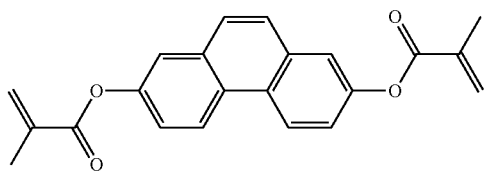
(C-3-1)

Monomers other than the monomer represented by the formula (C-3-1) above may be used as the photopolymerizable monomer.

For example, a monomer represented by the formula (C-1-1) above in which the skeleton part of the monomer represented by the formula (C-3-1) above is changed to biphenyl, and a monomer represented by the formula (C-1-2) above in which methacrylate groups at the terminal ends of the monomer represented by the formula (C-1-1) are changed to acrylate groups may be used. Further, in the formulae (C-1-1), (C-1-2), and (C-1-3), hydrogen atoms present at the skeleton part may be each individually substituted by a halogen atom.

After curing the seal material, a display region of the liquid crystal panel was irradiated with black light at an intensity of 3000 mJ/cm². As a result of this, the photopolymerizable monomer in the liquid crystal layer polymerized on the surfaces of the alignment films while involving liquid crystal molecules. As a result of this, the alignment of the liquid crystal on the surfaces of the alignment films was fixed by the polymer of the photopolymerizable monomer and thus a sufficient alignment regulating power was achieved.

Then, a pair of polarizing plates were attached to the back surface (surface on which light from a backlight is incident) side of the TFT substrate and the observation surface (surface from which light from a backlight is emitted) side of the CF substrate such that the polarization axes were in a relationship of crossed Nicols, and thus a liquid crystal panel for the FFS mode was produced. Subsequently, a backlight including white LEDs was attached to the back surface side of the liquid crystal panel, and thus the liquid crystal display device of Example 7 was completed.

COMPARATIVE EXAMPLE 9

A liquid crystal display device of Comparative Example 9 was produced in the same manner as in Example 7 except that no nitrobenzene derivative or antioxidant was added to the liquid crystal composition.

(Assessment Test 7)

A current was supplied, for 1000 hours, to the liquid crystal panels produced in Example 7 and Comparative Example 9 in the same manner as in Assessment Test 1, and the VHR before the supply of current (initial VHR) and after 1000 hours was measured. In addition, the screen of each liquid crystal panel was visually observed, and presence of stain and image sticking was checked. The results are shown in Table 7.

TABLE 7

|  | VHR (%) (Initial) | VHR (%) (After 1000 hours) | Stain (After 1000 hours) | Image sticking (After 1000 hours) |
|---|---|---|---|---|
| Example 7 | 99.0 | 98.0 | Not present | Not present |
| Comparative Example 9 | 99.0 | 96.0 | Present | Present |

As can be seen from Table 7, the result of comparison between Example 7 and Comparative Example 9 Indicates that the decrease of VHR was successfully suppressed by adding a nitrobenzene derivative and an antioxidant to the liquid crystal material. In addition, stain and image sticking were observed in Comparative Example 9. The stain and image sticking are considered to be caused by the decrease of VHR. In contrast, in Example 7, such a malfunction was not observed as a result of adding a nitrobenzene derivative.

The photopolymerizable monomer used in Example 7 and Comparative Example 9 serves as a radical generation source. Accordingly, in Example 7 and Comparative Example 9, the photopolymerizable monomer is present as a radical generation source in addition to the photo-alignment films, and radicals are likely to be generated in the liquid crystal layer. With regard to this, by adding a nitrobenzene derivative to the liquid crystal material, not only radicals generated by a reaction of the photo-alignment films but also the photopolymerizable monomer remaining after PSA treatment can be effectively deactivated. In addition, a similar effect can be achieved by adding an antioxidant to the liquid crystal material. For the reasons above, although stain and image sticking occurred in Comparative Example 9, the stain and image sticking could be effectively prevented in Example 7.

EXAMPLE 8

A liquid crystal display device of Example 8 was produced in the same manner as in Example 3 except that a compound including one nitrobenzene skeleton in one molecule represented by a formula (H-1-1) below was used as the nitrobenzene derivative.

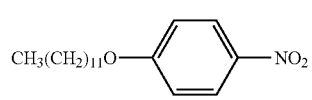
(H-1-1)

(Assessment Test 8)

A current was supplied, for 1000 hours, to the liquid crystal panel produced in Example 8 in the same manner as in Assessment Test 1, and the VHR before the supply of current (initial VHR) and after 1000 hours was measured. In addition, the screen of each liquid crystal panel was visually observed, and presence of stain and image sticking was checked. The results are shown in Table 8.

TABLE 8

|  | VHR (%) (Initial) | VHR (%) (After 1000 hours) | Stain (After 1000 hours) | Image sticking (After 1000 hours) |
|---|---|---|---|---|
| Example 8 | 99.0 | 98.2 | Not present | Not present |

As can be seen from Table 8, in Example 8 in which a compound including one nitrobenzene skeleton in one molecule was used as the nitrobenzene derivative, the decrease of VHR could be suppressed. In addition, stain and image sticking could be effectively prevented.

[Additional Remarks]

An embodiment of the present invention may be a liquid crystal display device of the present invention that includes an active matrix liquid crystal panel and a backlight, the liquid crystal panel including a liquid crystal layer, a pair of substrates that sandwich the liquid crystal layer in between, and an alignment film disposed on a liquid crystal layer side surface of each of the substrates, each alignment film being a photo-alignment film formed from a material that exhibits a photo-alignment characteristic and containing carboxyl groups on the liquid crystal layer side, the liquid crystal layer containing a liquid crystal material and a nitrobenzene derivative represented by a formula (1) below. According to the embodiment described above, radicals eluted into the liquid crystal layer can be efficiently scavenged and deactivated by a nitrobenzene derivative, and thus the decrease of VHR can be prevented. As a result of this, a good VHR can be retained for a long period of time by using a photo-alignment film, and occurrence of image sticking and stain in a display screen can be prevented.

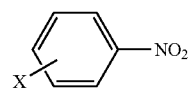
(1)

(In the formula, X represents a monovalent organic group.)

It is preferable that the nitrobenzene derivative is a compound represented by a formula (2-1), (2-2), (2-3), (2-4), or (2-5) below. The compound represented by the formula (2-1), (2-2), (2-3), (2-4), or (2-5) below has a high reactivity with radicals, and thus can quickly deactivate radicals in the liquid crystal layer.

(2-1)

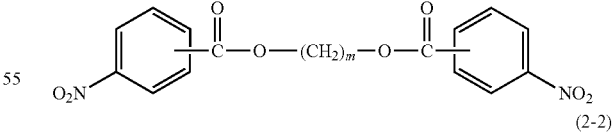
(2-2)

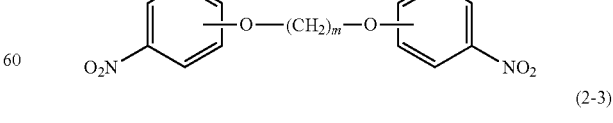
(2-3)

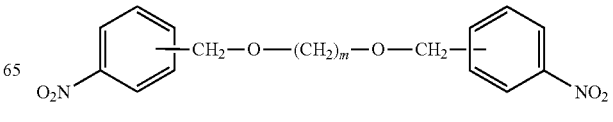

(2-4)
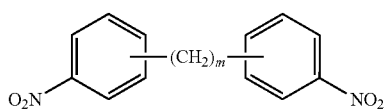

(2-5)
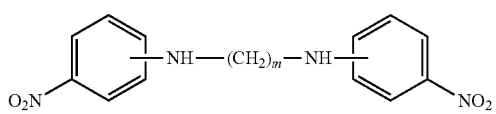

(In the formulae, m represents an even number from 2 to 18.)

It is preferable that the nitrobenzene derivative is a compound represented by a formula (3-1), (3-2), (3-3), or (3-4) below.

(3-1)
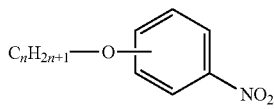

(3-2)
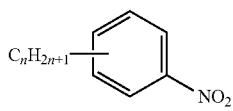

(3-3)
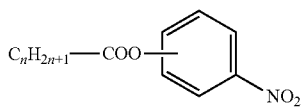

(3-4)
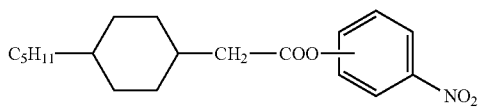

(In the formulae, n represents an integer from 1 to 18.)

The liquid crystal layer may further contain an antioxidant represented by a formula (4) below. By containing the antioxidant represented by the formula (4) below, groups such as alkyl groups (R) contained in the liquid crystal, alignment films, and seal material can be prevented from being oxidized by oxygen entering the liquid crystal panel, and radicals generated from an oxidized matter thereof can be prevented from causing the decrease of VHR.

(4)
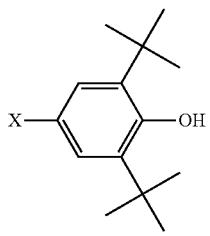

(In the formula, X represents a monovalent organic group.)

Examples of the photo-alignment films include photo-alignment films including at least one photoreactive part selected from the group consisting of cinnamate, chalcone, coumarin, stillbene, azobenzene, and phenol ester. In addition, the photo-alignment films may be polymers obtained by polymerizing a monomer containing an acid anhydride represented by a formula (5) below. The long wavelength side of an absorption spectrum of these photo-alignment films overlaps the short wavelength side of a light emission spectrum of the backlight, and these photo-alignment films generate radicals by being irradiated with light from the backlight. Accordingly, the effect of preventing the decrease of VHR when a nitrobenzene derivative is applied can be achieved sufficiently.

(5)
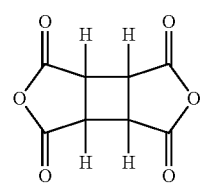

(In the formula, any of hydrogen atoms may be substituted).

A compound including an alkenyl structure may be used as at least one component of the liquid crystal material, and examples of the compound including an alkenyl structure include compounds represented by a formula (6-1), (6-2), or (6-3) below. Although a liquid crystal component including an alkenyl structure is effective for reducing the viscosity of a liquid crystal material, a double bond included in the alkenyl structure is likely to be attacked by a radical. Accordingly, the effect of preventing the decrease of VHR when a nitrobenzene derivative is applied can be achieved sufficiently.

(6-1)
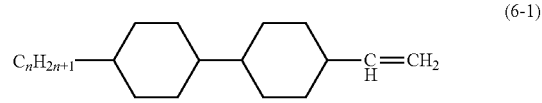

(6-2)
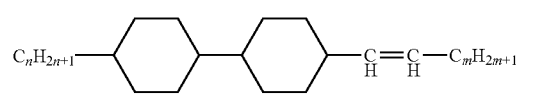

(6-3)
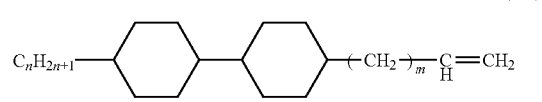
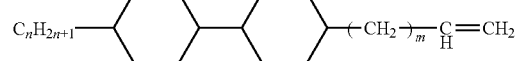

(In the formulae, m and n represent the same or different integers.)

The liquid crystal material may have a negative anisotropy of dielectric constant. Conventionally, there is a tendency that the malfunctions of image sticking and stain appear more prominently when a liquid crystal material having a negative anisotropy of dielectric constant is used than when a liquid crystal material having a positive anisotropy of dielectric constant is used. Accordingly, the effect of preventing the decrease of VHR when a nitrobenzene derivative is applied can be achieved more sufficiently.

At least one component of the liquid crystal material may be a compound including an alkoxy structure, and examples of the compound including an alkoxy structure include compounds represented by a formula (7-1), (7-2), (7-3), (7-4), or (7-5) below. An alkoxy structure (particularly, a methoxy group and an ethoxy group) includes an ionic state in a resonance structure thereof, and thus causes the decrease of VHR. Accordingly, it is desired that further decrease of the VHR is prevented by applying a nitrobenzene derivative.

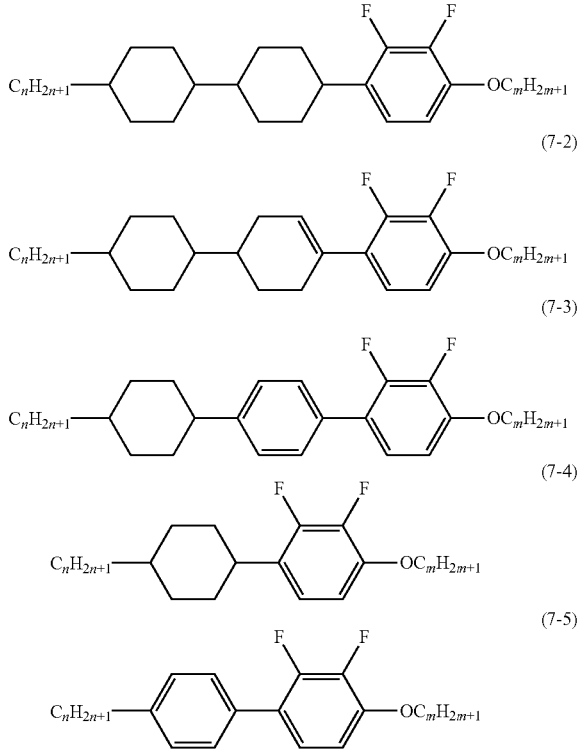

(In the formula, m and n represent the same or different integers.)

As the alignment mode of the liquid crystal panel, a 4-domain reverse TN mode, a fringe field switching mode, or an in-plane switching mode is preferably used.

In alignment treatment for the 4D-RTN mode, the FFS mode, and the IPS mode, it is required to control the azimuth of the liquid crystal alignment with a high precision, and thus photo-alignment treatment is preferably used. A nitrobenzene derivative can remarkably prevent the decrease of VHR when used in combination with a photo-alignment film. In addition, the amount of radiation in photo-alignment treatment of a horizontal alignment mode is normally larger than in the case of a vertical alignment mode by one digit or more, and more radicals are likely to be generated by a side reaction than in the case of the vertical alignment mode. Therefore, the effect of preventing the decrease of VHR can be sufficiently achieved when a nitrobenzene derivative is applied.

The liquid crystal panel may include, on a liquid crystal layer side surface of each of the alignment films, a layer containing a polymer obtained by a photopolymerizable monomer represented by a formula (8) below, and examples of Y in the formula (8) mentioned above include structures represented by a formula (9-1), (9-2), or (9-3) below. In the case where a photopolymerizable monomer is added to the liquid crystal layer for PSA treatment, the photopolymerizable monomer serves as a radical generation source in addition to the photo-alignment films, and thus radicals are likely to be generated in the liquid crystal layer. Accordingly, the effect of preventing the decrease of VHR when a nitrobenzene derivative is applied can be achieved sufficiently.

$$A1\text{-}Y\text{-}A2 \qquad (8)$$

(In the formula, Y represents a structure including at least one benzene ring and/or condensed benzene ring; any of hydrogen atoms in the benzene ring and condensed benzene ring may be substituted by a halogen atom; at least one of A1 and A2 represents acrylate or methacrylate; and A1 and A2 are directly bonded to the benzene ring or the condensed benzene ring.)

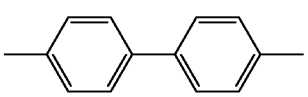

(9-1)

(9-2)

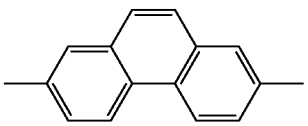

(9-3)

(In the formulae, any of hydrogen atoms may be substituted by halogen atoms).

The embodiments of the present invention shown above may be combined as appropriate within the spirit of the present invention.

REFERENCE SIGNS LIST

10: backlight
20: liquid crystal panel
21: substrate
22: alignment film
23: liquid crystal layer

The invention claimed is:
1. A liquid crystal display device comprising:
an active matrix liquid crystal panel; and
a backlight,
the liquid crystal panel including a liquid crystal layer, a pair of substrates that sandwich the liquid crystal layer in between, and an alignment film disposed on a liquid crystal layer side surface of each of the substrates,
each alignment film being a photo-alignment film formed from a material that exhibits a photo-alignment characteristic and containing carboxyl groups on the liquid crystal layer side,
the liquid crystal layer containing a liquid crystal material and a nitrobenzene derivative represented by a formula (2-1), (2-2), (2-3), (2-4), or (2-5) below:

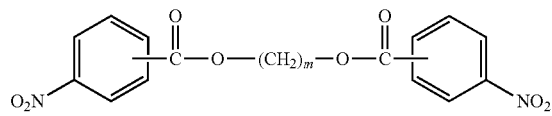

(2-1)

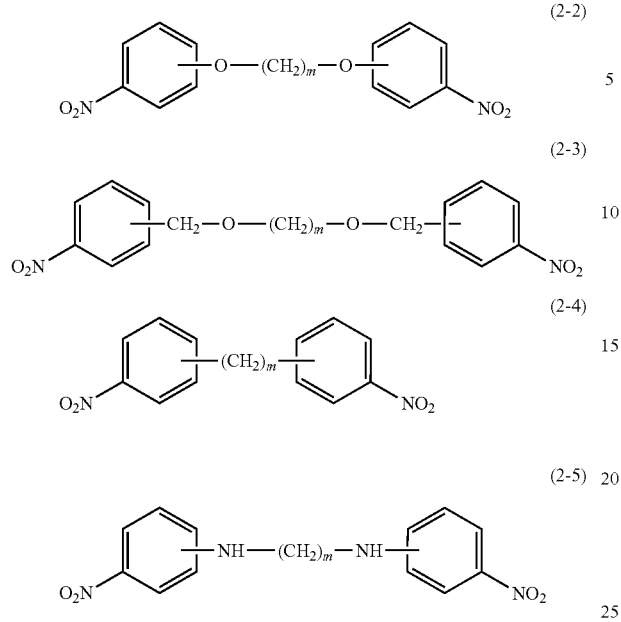

wherein m represents an even number from 2 to 18.

2. The liquid crystal display device according to claim 1, wherein the liquid crystal layer further contains an antioxidant represented by a formula (I-1), (I-2), (I-3), (I-a), (I-b), (I-c), (I-d), (I-e), or (I-f) below:

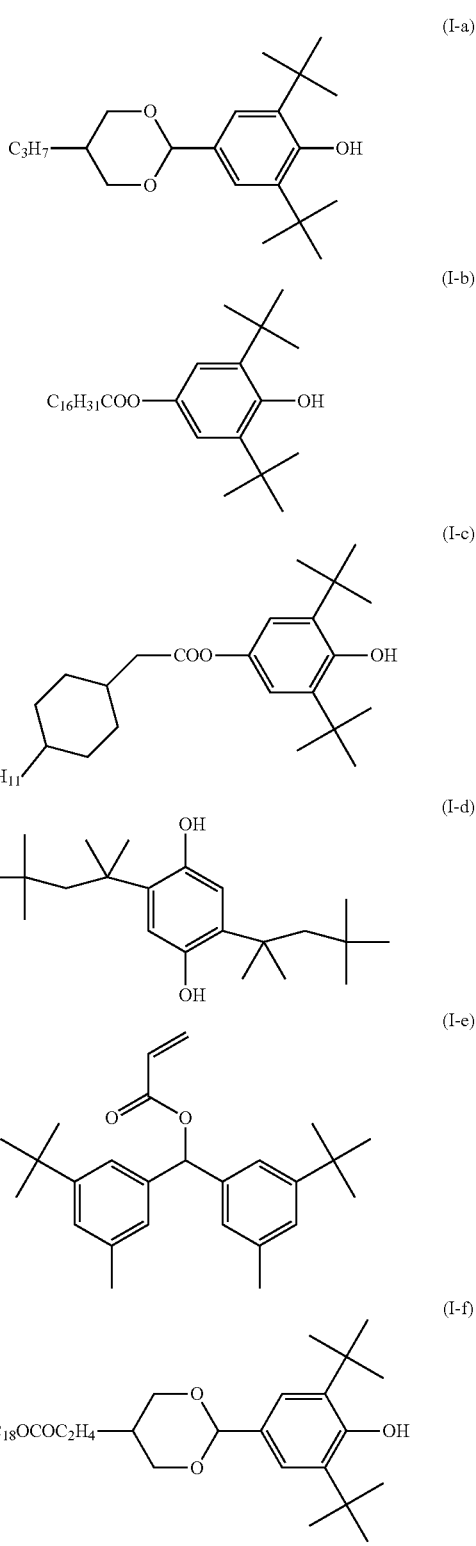

(In the formula, n represents an integer)

3. The liquid crystal display device according to claim 1, wherein the photo-alignment films each contain at least one photoreactive part selected from the group consisting of cinnamate and azobenzene.

4. The liquid crystal display device according to claim 1, wherein the photo-alignment films are polymers obtained by polymerizing a monomer containing an acid anhydride represented by a formula (5) below:

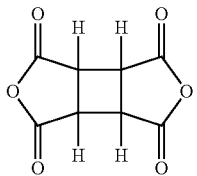

(5)

wherein any of hydrogen atoms may be substituted.

5. The liquid crystal display device according to claim 1, wherein at least one component of the liquid crystal material is a compound including an alkenyl structure.

6. The liquid crystal display device according to claim 5, wherein the compound including an alkenyl structure is a compound represented by a formula (6-1), (6-2), or (6-3) below:

$$C_nH_{2n+1}-\bigcirc-\bigcirc-\underset{H}{\overset{}{C}}=CH_2 \quad (6\text{-}1)$$

$$C_nH_{2n+1}-\bigcirc-\bigcirc-\underset{H}{\overset{}{C}}=\underset{H}{\overset{}{C}}-C_mH_{2m+1} \quad (6\text{-}2)$$

$$C_nH_{2n+1}-\bigcirc-\bigcirc-(CH_2)_m-\underset{H}{\overset{}{C}}=CH_2 \quad (6\text{-}3)$$

wherein m and n represent the same or different integers.

7. The liquid crystal display device according to claim 1, wherein the liquid crystal material has a negative anisotropy of dielectric constant.

8. The liquid crystal display device according to claim 7, wherein at least one component of the liquid crystal material is a compound including an alkoxy structure.

9. The liquid crystal display device according to claim 8, wherein the compound including an alkoxy structure is a compound represented by a formula (7-1), (7-2), (7-3), (7-4), or (7-5) below:

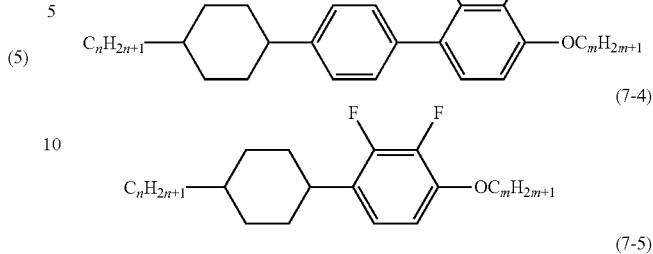

wherein m and n represent the same or different integers.

10. The liquid crystal display device according to claim 1, wherein an alignment mode of the liquid crystal panel is a 4-domain reverse TN mode, a fringe field switching mode, or an in-plane switching mode.

11. The liquid crystal display device according to claim 1, wherein the liquid crystal panel includes, on the liquid crystal layer side surface of each photo-alignment film, a layer containing a polymer obtained by polymerizing a photopolymerizable monomer represented by a formula (8) below:

$$A1\text{-}Y\text{-}A2 \quad (8)$$

wherein Y represents a structure containing at least one benzene ring and/or condensed benzene ring; any of hydrogen atoms in the benzene ring and condensed benzene ring may be substituted by a halogen atom; at least one of A1 and A2 represents acrylate or methacrylate; and A1 and A2 are directly bonded to the benzene ring or the condensed benzene ring.

12. The liquid crystal display device according to claim 11, wherein Y in the formula (8) represents a structure represented by a formula (9-1), (9-2), or (9-3) below:

(9-1)

—⬡—⬡—

(9-2)

—⬡—⬡—⬡—

(9-3)

(phenanthrene structure)

wherein any of hydrogen atoms may be substituted by halogen atoms.

* * * * *